(12) United States Patent
Short et al.

(10) Patent No.: US 8,594,107 B2
(45) Date of Patent: *Nov. 26, 2013

(54) SYSTEM AND METHOD FOR ESTABLISHING NETWORK CONNECTION

(75) Inventors: Joel E. Short, Los Angeles, CA (US); Leonard Kleinrock, Los Angeles, CA (US)

(73) Assignee: Nomadix, Inc., Agoura Hills, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/225,059

(22) Filed: Sep. 2, 2011

(65) Prior Publication Data

US 2011/0317693 A1    Dec. 29, 2011

Related U.S. Application Data

(63) Continuation of application No. 12/240,427, filed on Sep. 29, 2008, now Pat. No. 8,027,339, which is a continuation of application No. 11/097,925, filed on Apr. 1, 2005, now Pat. No. 7,554,995, which is a continuation of application No. 09/684,937, filed on Oct. 6, 2000, now Pat. No. 7,088,727, which is a continuation-in-part of application No. 09/041,534, filed on Mar. 12, 1998, now Pat. No. 6,130,892, which is a continuation-in-part of application No. 08/816,174, filed on Mar. 12, 1997, now abandoned.

(51) Int. Cl.
*H04L 12/28* (2006.01)

(52) U.S. Cl.
USPC .......................................... 370/401; 370/338

(58) Field of Classification Search
USPC ............. 370/352, 389, 392, 395.54; 455/455
See application file for complete search history.

(56) References Cited

U.S. PATENT DOCUMENTS

| | | | |
|---|---|---|---|
| 4,677,588 A | 6/1987 | Benjamin |
| 4,811,011 A | 3/1989 | Sollinger |
| 5,065,393 A | 11/1991 | Sibbitt |
| 5,113,499 A | 5/1992 | Ankney et al. |
| 5,124,984 A | 6/1992 | Engel |
| 5,142,622 A | 8/1992 | Owens |

(Continued)

FOREIGN PATENT DOCUMENTS

| AU | 2003255101 | 3/2004 |
|---|---|---|
| CA | 2330857 | 11/1999 |

(Continued)

OTHER PUBLICATIONS

Aboba, B., 1. Lu, J. Alsop, 1. Ding, W. Wang; Review of Roaming Implementations; Sep. 1997; 35 Pages; Network Working Group, Request for Comments 2194.

(Continued)

*Primary Examiner* — Gary Mui
(74) *Attorney, Agent, or Firm* — Knobbe Martens Olson & Bear LLP

(57) ABSTRACT

Systems and methods of enabling a user host device to communicate on a network. In an embodiment, a system receives a request packet from a user host device. The request packet, such as an ARP request packet, may include a target IP address that corresponds to a static IP address that is different from any IP address associated with the system. In response to receiving the request packet, the system may send a response packet, such as an ARP response packet, with a sender address that corresponds to the static IP address, and with a sender hardware address that corresponds to a hardware address of the system.

20 Claims, 10 Drawing Sheets

(56) References Cited

U.S. PATENT DOCUMENTS

| | | | |
|---|---|---|---|
| 5,159,592 | A | 10/1992 | Perkins |
| 5,166,931 | A | 11/1992 | Riddle |
| 5,185,860 | A | 2/1993 | Wu |
| 5,251,207 | A | 10/1993 | Abensour et al. |
| 5,258,906 | A | 11/1993 | Kroll |
| 5,293,488 | A | 3/1994 | Riley |
| 5,309,437 | A | 5/1994 | Perlman |
| 5,325,362 | A | 6/1994 | Aziz |
| 5,329,619 | A | 7/1994 | Page |
| 5,369,705 | A | 11/1994 | Bird |
| 5,371,852 | A | 12/1994 | Attanasio |
| 5,406,555 | A | 4/1995 | Yoshida |
| 5,410,543 | A | 4/1995 | Seitz et al. |
| 5,412,654 | A | 5/1995 | Perkins |
| 5,420,862 | A | 5/1995 | Perlman |
| 5,425,029 | A | 6/1995 | Hluchyj et al. |
| 5,442,633 | A | 8/1995 | Perkins et al. |
| 5,481,542 | A | 1/1996 | Logston |
| 5,490,139 | A | 2/1996 | Baker et al. |
| 5,490,252 | A | 2/1996 | Macera |
| 5,517,618 | A | 5/1996 | Wada et al. |
| 5,517,622 | A | 5/1996 | Ivanoff et al. |
| 5,526,489 | A | 6/1996 | Nilakantan |
| 5,533,026 | A | 7/1996 | Ahmadi |
| 5,539,736 | A | 7/1996 | Johnson |
| 5,548,646 | A | 8/1996 | Aziz |
| 5,550,984 | A | 8/1996 | Gelb |
| 5,553,223 | A | 9/1996 | Greenlee et al. |
| 5,557,748 | A | 9/1996 | Norris |
| 5,572,528 | A | 11/1996 | Shuen |
| 5,574,779 | A | 11/1996 | Ely |
| 5,583,864 | A | 12/1996 | Lightfoot |
| 5,586,269 | A | 12/1996 | Kubo |
| 5,592,537 | A | 1/1997 | Moen |
| 5,598,536 | A | 1/1997 | Slaughter |
| 5,604,896 | A | 2/1997 | Duxbury |
| 5,606,668 | A | 2/1997 | Shwed |
| 5,608,786 | A | 3/1997 | Gordon |
| 5,612,730 | A | 3/1997 | Lewis |
| 5,615,339 | A | 3/1997 | Ban |
| 5,623,600 | A | 4/1997 | Ji et al. |
| 5,623,601 | A | 4/1997 | Vu |
| 5,633,868 | A | 5/1997 | Baldwin et al. |
| 5,633,999 | A | 5/1997 | Clowes |
| 5,636,216 | A | 6/1997 | Fox et al. |
| 5,636,371 | A | 6/1997 | Yu |
| 5,644,719 | A | 7/1997 | Aridas |
| 5,649,001 | A | 7/1997 | Thomas |
| 5,651,002 | A | 7/1997 | Van Seters et al. |
| 5,652,908 | A | 7/1997 | Douglas |
| 5,657,452 | A | 8/1997 | Kralowetz |
| 5,659,684 | A | 8/1997 | Giovannoni |
| 5,664,102 | A | 9/1997 | Faynberg |
| 5,678,041 | A | 10/1997 | Baker |
| 5,696,898 | A | 12/1997 | Baker et al. |
| 5,696,899 | A | 12/1997 | Kalwitz |
| 5,699,520 | A | 12/1997 | Hodgson |
| 5,708,654 | A | 1/1998 | Arndt |
| 5,708,655 | A | 1/1998 | Toth et al. |
| 5,708,780 | A | 1/1998 | Levergood et al. |
| 5,717,737 | A | 2/1998 | Doviak |
| 5,724,510 | A | 3/1998 | Arndt |
| 5,742,668 | A | 4/1998 | Pepe et al. |
| 5,742,762 | A | 4/1998 | Scholl et al. |
| 5,745,884 | A | 4/1998 | Carnegie et al. |
| 5,749,075 | A | 5/1998 | Toader et al. |
| 5,751,961 | A | 5/1998 | Smyk |
| 5,751,971 | A | 5/1998 | Dobbins |
| 5,757,784 | A | 5/1998 | Liebowitz |
| 5,757,924 | A | 5/1998 | Friedman et al. |
| 5,758,186 | A | 5/1998 | Hamilton |
| 5,761,683 | A | 6/1998 | Logan et al. |
| 5,764,890 | A | 6/1998 | Glasser |
| 5,774,668 | A | 6/1998 | Choquier |
| 5,774,869 | A | 6/1998 | Toader |
| 5,781,550 | A | 7/1998 | Templin et al. |
| 5,781,552 | A | 7/1998 | Hashimoto |
| 5,790,541 | A | 8/1998 | Patrick et al. |
| 5,790,548 | A | 8/1998 | Sistanizadeh |
| 5,793,762 | A | 8/1998 | Penners et al. |
| 5,793,763 | A | 8/1998 | Mayes et al. |
| 5,794,221 | A | 8/1998 | Egendorf |
| 5,798,706 | A | 8/1998 | Kraemer et al. |
| 5,802,047 | A | 9/1998 | Kinoshita |
| 5,802,285 | A | 9/1998 | Hirviniemi |
| 5,802,320 | A | 9/1998 | Baehr et al. |
| 5,802,502 | A | 9/1998 | Gell et al. |
| 5,805,803 | A | 9/1998 | Birrell et al. |
| 5,806,043 | A | 9/1998 | Toader |
| 5,812,531 | A | 9/1998 | Cheung et al. |
| 5,812,776 | A | 9/1998 | Gifford |
| 5,812,786 | A | 9/1998 | Seazholtz |
| 5,812,819 | A | 9/1998 | Rodwin |
| 5,815,664 | A | 9/1998 | Asano |
| 5,822,526 | A | 10/1998 | Waskiewicz |
| 5,832,229 | A | 11/1998 | Tomoda |
| 5,835,061 | A | 11/1998 | Stewart |
| 5,835,724 | A | 11/1998 | Smith |
| 5,835,725 | A | 11/1998 | Chiang |
| 5,835,727 | A | 11/1998 | Wong |
| 5,841,769 | A | 11/1998 | Okanoue et al. |
| 5,844,973 | A | 12/1998 | Venkatraman |
| 5,845,070 | A | 12/1998 | Ikudome |
| 5,848,233 | A | 12/1998 | Radia |
| 5,852,812 | A | 12/1998 | Reeder |
| 5,854,901 | A | 12/1998 | Cole |
| 5,856,974 | A | 1/1999 | Gervais |
| 5,862,328 | A | 1/1999 | Colyer |
| 5,862,345 | A | 1/1999 | Okanoue et al. |
| 5,864,610 | A | 1/1999 | Ronen |
| 5,864,683 | A | 1/1999 | Boebert |
| 5,881,234 | A | 3/1999 | Schwob |
| 5,884,035 | A | 3/1999 | Butman et al. |
| 5,889,958 | A | 3/1999 | Willens |
| 5,893,077 | A | 4/1999 | Griffin |
| 5,894,321 | A | 4/1999 | Downs |
| 5,894,479 | A | 4/1999 | Mohammed |
| 5,903,732 | A | 5/1999 | Reed |
| 5,909,549 | A | 6/1999 | Complement |
| 5,910,954 | A | 6/1999 | Bronstein et al. |
| 5,915,093 | A | 6/1999 | Berlin |
| 5,915,119 | A | 6/1999 | Cone |
| 5,916,302 | A | 6/1999 | Dunn |
| 5,918,016 | A | 6/1999 | Brewer |
| 5,918,018 | A | 6/1999 | Gooderum |
| 5,920,699 | A | 7/1999 | Bare |
| 5,922,049 | A | 7/1999 | Radia |
| 5,923,853 | A | 7/1999 | Danneels |
| 5,930,255 | A | 7/1999 | Tsukamoto et al. |
| 5,931,917 | A | 8/1999 | Nguyen |
| 5,940,394 | A | 8/1999 | Killian |
| 5,941,947 | A | 8/1999 | Brown |
| 5,941,988 | A | 8/1999 | Bhagwat et al. |
| 5,946,687 | A | 8/1999 | Gehani |
| 5,948,061 | A | 9/1999 | Merriman et al. |
| 5,949,875 | A | 9/1999 | Walker |
| 5,950,195 | A | 9/1999 | Stockwell et al. |
| 5,951,694 | A | 9/1999 | Choquier |
| 5,958,018 | A | 9/1999 | Eng |
| 5,960,409 | A | 9/1999 | Wexler |
| 5,963,915 | A | 10/1999 | Kirsch |
| 5,968,126 | A | 10/1999 | Ekstrom |
| 5,968,176 | A | 10/1999 | Nessett et al. |
| 5,969,678 | A | 10/1999 | Stewart |
| 5,982,773 | A | 11/1999 | Nishimura |
| 5,987,430 | A | 11/1999 | Van Horne et al. |
| 5,987,498 | A | 11/1999 | Athing et al. |
| 5,987,523 | A | 11/1999 | Hind |
| 5,987,611 | A | 11/1999 | Freund |
| 5,991,292 | A | 11/1999 | Focsaneanu et al. |
| 5,991,828 | A | 11/1999 | Horie et al. |
| 5,999,536 | A | 12/1999 | Kawafuji |
| 5,999,912 | A | 12/1999 | Wodraz |
| 6,006,258 | A | 12/1999 | Kalajan |

(56) References Cited

U.S. PATENT DOCUMENTS

| | | |
|---|---|---|
| 6,006,272 A | 12/1999 | Aravamudan et al. |
| 6,011,782 A | 1/2000 | DeSimone |
| 6,012,083 A | 1/2000 | Savitzky |
| 6,012,088 A | 1/2000 | Li et al. |
| 6,014,698 A | 1/2000 | Griffiths |
| 6,018,771 A | 1/2000 | Hayden |
| 6,028,848 A | 2/2000 | Bhatia |
| 6,035,281 A | 3/2000 | Crosskey |
| 6,038,233 A | 3/2000 | Hamamoto |
| 6,044,062 A | 3/2000 | Brownrigg |
| 6,047,051 A | 4/2000 | Ginzboorg et al. |
| 6,052,725 A | 4/2000 | McCann et al. |
| 6,055,236 A | 4/2000 | Nessett |
| 6,055,243 A | 4/2000 | Vincent et al. |
| 6,058,418 A | 5/2000 | Kobata |
| 6,058,429 A | 5/2000 | Ames et al. |
| 6,061,349 A | 5/2000 | Coile |
| 6,061,356 A | 5/2000 | Terry |
| 6,061,650 A | 5/2000 | Malkin |
| 6,061,668 A | 5/2000 | Sharrow |
| 6,061,739 A | 5/2000 | Reed |
| 6,064,674 A | 5/2000 | Doidge et al. |
| 6,070,187 A | 5/2000 | Subramaniam et al. |
| 6,070,243 A | 5/2000 | See |
| 6,073,160 A | 6/2000 | Grantham |
| 6,073,175 A | 6/2000 | Tavs |
| 6,085,247 A | 7/2000 | Parsons, Jr. et al. |
| 6,088,451 A | 7/2000 | He |
| 6,088,725 A | 7/2000 | Kondo et al. |
| 6,091,732 A | 7/2000 | Alexander |
| 6,092,196 A | 7/2000 | Reiche |
| 6,094,659 A | 7/2000 | Bhatia |
| 6,098,172 A | 8/2000 | Coss et al. |
| 6,101,543 A | 8/2000 | Alden |
| 6,108,330 A | 8/2000 | Bhatia |
| 6,115,545 A | 9/2000 | Mellquist |
| 6,119,160 A | 9/2000 | Zhang et al. |
| 6,119,162 A | 9/2000 | Li et al. |
| 6,122,268 A | 9/2000 | Okanoue |
| 6,128,298 A | 10/2000 | Wootton |
| 6,128,601 A | 10/2000 | Van Horne et al. |
| 6,128,664 A | 10/2000 | Yanagidate et al. |
| 6,128,739 A | 10/2000 | Fleming, III |
| 6,130,892 A | 10/2000 | Short et al. |
| 6,134,680 A | 10/2000 | Yeomans |
| 6,137,791 A | 10/2000 | Frid |
| 6,137,869 A | 10/2000 | Voit |
| 6,138,142 A | 10/2000 | Linsk |
| 6,138,144 A | 10/2000 | DeSimone |
| 6,141,010 A | 10/2000 | Hoyle |
| 6,141,653 A | 10/2000 | Conklin |
| 6,141,690 A | 10/2000 | Weiman |
| 6,144,991 A | 11/2000 | England |
| 6,147,976 A | 11/2000 | Shand |
| 6,154,172 A | 11/2000 | Piccionelli |
| 6,154,764 A | 11/2000 | Nitta |
| 6,154,775 A | 11/2000 | Coss |
| 6,154,839 A | 11/2000 | Arrow |
| 6,157,377 A | 12/2000 | Shah-Nazaroff |
| 6,157,946 A | 12/2000 | Itakura et al. |
| 6,157,953 A | 12/2000 | Chang |
| 6,158,008 A | 12/2000 | Maria |
| 6,160,874 A | 12/2000 | Dickerman |
| 6,161,139 A | 12/2000 | Win et al. |
| 6,166,730 A | 12/2000 | Goode |
| 6,167,513 A | 12/2000 | Inoue |
| 6,173,322 B1 | 1/2001 | Hu |
| 6,182,141 B1 | 1/2001 | Blum et al. |
| 6,182,154 B1 | 1/2001 | Campagnoni |
| 6,199,100 B1 | 3/2001 | Filepp |
| 6,201,962 B1 | 3/2001 | Sturniolo |
| 6,202,169 B1 | 3/2001 | Razzaghe-Ashrafi |
| 6,205,148 B1 | 3/2001 | Takahashi |
| 6,205,481 B1 | 3/2001 | Heddaya et al. |
| 6,208,977 B1 | 3/2001 | Hernandez et al. |
| 6,219,694 B1 | 4/2001 | Lazaridis et al. |
| 6,219,786 B1 | 4/2001 | Cunningham |
| 6,219,790 B1 | 4/2001 | Lloyd |
| 6,223,286 B1 | 4/2001 | Hashimoto |
| 6,226,677 B1 | 5/2001 | Slenuner |
| 6,226,752 B1 | 5/2001 | Gupta et al. |
| 6,233,604 B1 | 5/2001 | Van Horne et al. |
| 6,233,618 B1 | 5/2001 | Shannon |
| 6,233,686 B1 | 5/2001 | Zenchelsky et al. |
| 6,237,026 B1 | 5/2001 | Prasad |
| 6,240,091 B1 | 5/2001 | Ginzboorg |
| 6,240,402 B1 | 5/2001 | Lynch-Aird |
| 6,240,513 B1 | 5/2001 | Friedman |
| 6,240,533 B1 | 5/2001 | Slemmer |
| 6,243,379 B1 | 6/2001 | Veerina et al. |
| 6,247,054 B1 | 6/2001 | Malkin |
| 6,249,527 B1 | 6/2001 | Verthein et al. |
| 6,249,820 B1 | 6/2001 | Dobbins |
| 6,256,307 B1 | 7/2001 | Salmonson |
| 6,259,405 B1 | 7/2001 | Stewart |
| 6,282,180 B1 | 8/2001 | Paneth |
| 6,286,039 B1 | 9/2001 | Van Horne et al. |
| 6,288,739 B1 | 9/2001 | Hales |
| 6,292,478 B1 | 9/2001 | Farris |
| 6,295,291 B1 | 9/2001 | Larkins |
| 6,298,383 B1 | 10/2001 | Gutman |
| 6,304,857 B1 | 10/2001 | Heindel |
| 6,307,836 B1 | 10/2001 | Jones et al. |
| 6,308,212 B1 | 10/2001 | Besaw |
| 6,311,275 B1 | 10/2001 | Jin |
| 6,317,790 B1 | 11/2001 | Bowker et al. |
| 6,317,837 B1 | 11/2001 | Kenworthy |
| 6,321,336 B1 | 11/2001 | Applegate |
| 6,326,918 B1 | 12/2001 | Stewart |
| 6,330,586 B1 | 12/2001 | Yates |
| 6,338,046 B1 | 1/2002 | Saari et al. |
| 6,349,289 B1 | 2/2002 | Peterson et al. |
| 6,366,893 B2 | 4/2002 | Hannula |
| 6,377,982 B1 | 4/2002 | Rai |
| 6,377,990 B1 | 4/2002 | Slemmer et al. |
| 6,381,646 B2 | 4/2002 | Zhang |
| 6,381,650 B1 | 4/2002 | Peacock |
| 6,385,653 B1 | 5/2002 | Sitaraman et al. |
| 6,389,462 B1 | 5/2002 | Cohen |
| 6,393,468 B1 | 5/2002 | McGee |
| 6,408,336 B1 | 6/2002 | Schneider |
| 6,410,543 B1 | 6/2002 | Strobel et al. |
| 6,412,073 B1 | 6/2002 | Rangan |
| 6,414,635 B1 | 7/2002 | Stewart et al. |
| 6,418,324 B1 | 7/2002 | Doviak |
| 6,424,636 B1 | 7/2002 | Seazholtz |
| 6,427,170 B1 | 7/2002 | Sitaraman et al. |
| 6,427,174 B1 | 7/2002 | Sitaraman et al. |
| 6,434,627 B1 | 8/2002 | Millet et al. |
| 6,438,125 B1 | 8/2002 | Brothers |
| 6,438,528 B1 | 8/2002 | Jensen |
| 6,438,578 B1 | 8/2002 | Schmid |
| 6,452,498 B2 | 9/2002 | Stewart |
| 6,453,353 B1 | 9/2002 | Win |
| 6,460,084 B1 | 10/2002 | Van Horne et al. |
| 6,463,051 B1 | 10/2002 | Ford |
| 6,463,473 B1 | 10/2002 | Gubbi |
| 6,463,474 B1 | 10/2002 | Fuh |
| 6,466,976 B1 | 10/2002 | Alles |
| 6,466,981 B1 | 10/2002 | Levy |
| 6,466,986 B1 | 10/2002 | Sawyer et al. |
| 6,470,027 B1 | 10/2002 | Birrell |
| 6,470,386 B1 | 10/2002 | Combar |
| 6,473,411 B1 | 10/2002 | Kumaki |
| 6,480,486 B2 | 11/2002 | Kikinis |
| 6,487,538 B1 | 11/2002 | Gupta |
| 6,490,620 B1 | 12/2002 | Ditmer et al. |
| 6,496,704 B2 | 12/2002 | Yuan et al. |
| 6,496,850 B1 | 12/2002 | Bowman-Amuah |
| 6,502,131 B1 | 12/2002 | Vaid et al. |
| 6,513,060 B1 | 1/2003 | Nixon et al. |
| 6,515,989 B1 | 2/2003 | Ronneke |
| 6,519,636 B2 | 2/2003 | Engel |
| 6,519,643 B1 | 2/2003 | Foulkes |

(56) References Cited

U.S. PATENT DOCUMENTS

| | | |
|---|---|---|
| 6,523,028 B1 | 2/2003 | DiDomizio |
| 6,535,493 B1 | 3/2003 | Lee et al. |
| 6,535,511 B1 | 3/2003 | Rao |
| 6,539,431 B1 | 3/2003 | Sitaraman et al. |
| 6,546,392 B1 | 4/2003 | Bahlmann |
| 6,546,425 B1 | 4/2003 | Hanson et al. |
| 6,549,220 B1 | 4/2003 | Hsu |
| 6,553,178 B2 | 4/2003 | Abecassis |
| 6,557,038 B1 | 4/2003 | Becker |
| 6,571,221 B1 | 5/2003 | Stewart |
| 6,574,664 B1 | 6/2003 | Liu |
| 6,577,642 B1 | 6/2003 | Fijolek |
| 6,580,717 B1 | 6/2003 | Higuchi |
| 6,584,505 B1 | 6/2003 | Howard |
| 6,587,880 B1 | 7/2003 | Saigo |
| 6,591,306 B1 | 7/2003 | Redlich |
| 6,598,167 B2 | 7/2003 | Devine et al. |
| 6,609,154 B1 | 8/2003 | Fuh |
| 6,625,645 B1 | 9/2003 | Van Horne |
| 6,633,899 B1 | 10/2003 | Coward |
| 6,636,504 B1 | 10/2003 | Albers |
| 6,636,894 B1 | 10/2003 | Short et al. |
| 6,640,251 B1 | 10/2003 | Wiget et al. |
| 6,665,718 B1 | 12/2003 | Chuah |
| 6,667,968 B1 | 12/2003 | Tran |
| 6,671,379 B2 | 12/2003 | Nemirovski |
| 6,671,739 B1 | 12/2003 | Reed |
| 6,675,208 B1 | 1/2004 | Rai et al. |
| 6,681,330 B2 | 1/2004 | Bradford et al. |
| 6,687,732 B1 | 2/2004 | Bector |
| 6,697,018 B2 | 2/2004 | Stewart |
| 6,701,350 B1 | 3/2004 | Mitchell |
| 6,701,361 B1 | 3/2004 | Meier |
| 6,714,987 B1 | 3/2004 | Amin |
| 6,717,943 B1 | 4/2004 | Schwering |
| 6,728,884 B1 | 4/2004 | Lim |
| 6,731,612 B1 | 5/2004 | Koss |
| 6,732,176 B1 | 5/2004 | Stewart |
| 6,735,691 B1 | 5/2004 | Capps |
| 6,738,382 B1 | 5/2004 | West |
| 6,751,677 B1 | 6/2004 | Ilnicki |
| 6,759,960 B2 | 7/2004 | Stewart |
| 6,760,416 B1 | 7/2004 | Zimmerman |
| 6,771,609 B1 | 8/2004 | Gudat et al. |
| 6,771,661 B1 | 8/2004 | Chawla |
| 6,775,267 B1 | 8/2004 | Kung |
| 6,779,118 B1 | 8/2004 | Ikudome et al. |
| 6,785,730 B1 | 8/2004 | Taylor |
| 6,789,110 B1 | 9/2004 | Short |
| 6,822,954 B2 | 11/2004 | McConnell et al. |
| 6,822,955 B1 | 11/2004 | Brothers |
| 6,823,059 B2 | 11/2004 | Kalmanek |
| 6,834,341 B1 | 12/2004 | Bahl |
| 6,839,757 B1 | 1/2005 | Romano |
| 6,850,532 B2 | 2/2005 | Thubert |
| 6,856,676 B1 | 2/2005 | Pirot et al. |
| 6,856,800 B1 | 2/2005 | Henry et al. |
| 6,857,009 B1 | 2/2005 | Ferreria et al. |
| 6,868,399 B1 | 3/2005 | Short et al. |
| 6,876,668 B1 | 4/2005 | Chawla |
| 6,892,226 B1 | 5/2005 | Tso |
| 6,901,433 B2 | 5/2005 | San Andres |
| 6,907,449 B2 | 6/2005 | Srinivasan |
| 6,915,345 B1 | 7/2005 | Tummala |
| 6,922,672 B1 | 7/2005 | Hailpern |
| 6,934,754 B2 | 8/2005 | West et al. |
| 6,947,398 B1 | 9/2005 | Ahmed |
| 6,950,433 B1 | 9/2005 | Okamoto |
| 6,961,762 B1 | 11/2005 | Yeap |
| 6,970,927 B1 | 11/2005 | Stewart |
| 6,983,327 B2 | 1/2006 | Koperda |
| 6,996,073 B2 | 2/2006 | West |
| 7,003,578 B2 | 2/2006 | Kanada et al. |
| 7,007,080 B2 | 2/2006 | Wilson |
| 7,009,556 B2 | 3/2006 | Stewart |
| 7,016,960 B2 | 3/2006 | Howard |
| 7,032,243 B2 | 4/2006 | Leerssen et al. |
| 7,051,087 B1 | 5/2006 | Bahl et al. |
| 7,058,594 B2 | 6/2006 | Stewart |
| 7,072,056 B1 | 7/2006 | Greaves et al. |
| 7,080,077 B2 | 7/2006 | Ramamurthy |
| 7,088,727 B1 | 8/2006 | Short et al. |
| 7,120,678 B2 | 10/2006 | Greuel |
| 7,124,437 B2 | 10/2006 | Byrne |
| 7,126,915 B1 | 10/2006 | Lu |
| 7,139,268 B1 | 11/2006 | Bhagwat et al. |
| 7,145,898 B1 | 12/2006 | Elliott |
| 7,151,758 B2 | 12/2006 | Kumaki et al. |
| 7,159,035 B2 | 1/2007 | Garcia-Luna-Aceves et al. |
| 7,194,554 B1 | 3/2007 | Short et al. |
| 7,225,249 B1 | 5/2007 | Barry |
| 7,240,106 B2 | 7/2007 | Cochran et al. |
| 7,269,653 B2 | 9/2007 | Mentze et al. |
| 7,293,077 B1 | 11/2007 | Teo |
| 7,313,631 B1 | 12/2007 | Sesmun et al. |
| 7,319,673 B1 | 1/2008 | Briscoe |
| 7,324,972 B1 | 1/2008 | Oliver |
| 7,325,063 B2 | 1/2008 | Dillon |
| 7,349,982 B2 | 3/2008 | Hannum et al. |
| 7,356,841 B2 | 4/2008 | Wilson et al. |
| 7,376,113 B2 | 5/2008 | Taylor et al. |
| 7,401,120 B2 | 7/2008 | Walbeck |
| 7,428,413 B2 | 9/2008 | Fink |
| 7,472,191 B2 | 12/2008 | Stewart |
| 7,474,617 B2 | 1/2009 | Molen et al. |
| 7,512,136 B2 | 3/2009 | Korotin |
| 7,526,538 B2 | 4/2009 | Wilson |
| 7,552,090 B1 | 6/2009 | Barber |
| 7,554,995 B2 | 6/2009 | Short |
| 7,580,376 B2 | 8/2009 | West |
| 7,602,782 B2 | 10/2009 | Doviak |
| 8,027,339 B2 | 9/2011 | Short et al. |
| 2002/0021689 A1 | 2/2002 | Robbins |
| 2002/0097674 A1 | 7/2002 | Balabhadraptreuni et al. |
| 2002/0152311 A1 | 10/2002 | Veltman et al. |
| 2002/0178070 A1 | 11/2002 | Leveridge |
| 2003/0067911 A1 | 4/2003 | Kikinis |
| 2004/0015572 A1 | 1/2004 | Kang |
| 2004/0030797 A1 | 2/2004 | Akinlar et al. |
| 2004/0076144 A1 | 4/2004 | Ishidoshiro |
| 2005/0021943 A1 | 1/2005 | Ikudome |
| 2005/0102205 A1 | 5/2005 | Yamamato |
| 2006/0174019 A1 | 8/2006 | Ikudome |
| 2007/0201702 A1 | 8/2007 | Hendricks |
| 2007/0266125 A1 | 11/2007 | Lu et al. |
| 2007/0294417 A1 | 12/2007 | Ikudome |
| 2009/0024745 A1 | 1/2009 | Short et al. |

FOREIGN PATENT DOCUMENTS

| | | |
|---|---|---|
| EP | 0691772 A2 | 1/1996 |
| EP | 0762707 | 3/1997 |
| EP | 0848338 | 6/1998 |
| EP | 0889418 | 1/1999 |
| EP | 0909073 | 4/1999 |
| EP | 1076975 | 11/1999 |
| EP | 0986230 | 3/2000 |
| EP | 1111872 | 6/2001 |
| EP | 1026853 | 12/2007 |
| GB | 2283645 | 5/1995 |
| GB | 2326306 | 12/1998 |
| JP | 5-344122 | 12/1993 |
| JP | 6-209319 | 7/1994 |
| JP | 7-030575 | 1/1995 |
| JP | 7-066809 | 3/1995 |
| JP | 7-202931 | 8/1995 |
| JP | 8-065306 | 3/1996 |
| JP | 8-242231 | 9/1996 |
| JP | 8-265372 | 10/1996 |
| JP | 9-046352 | 2/1997 |
| JP | 10-105516 A | 4/1998 |
| JP | 11-055326 | 2/1999 |
| JP | 11-055726 | 2/1999 |
| JP | 11-282804 A | 10/1999 |

(56) References Cited

FOREIGN PATENT DOCUMENTS

| | | |
|---|---|---|
| JP | 2000-059416 | 2/2000 |
| JP | 2000-354127 | 12/2000 |
| JP | 2002-111870 | 4/2002 |
| WO | WO 95/27942 | 10/1995 |
| WO | WO 96/05549 | 2/1996 |
| WO | WO 96/39668 | 12/1996 |
| WO | WO 97/09672 | 3/1997 |
| WO | WO 97/11429 | 3/1997 |
| WO | WO 97/27546 | 7/1997 |
| WO | WO 97/41586 | 11/1997 |
| WO | WO 97/48210 | 12/1997 |
| WO | WO 98/12643 | 3/1998 |
| WO | WO 98/16044 | 4/1998 |
| WO | WO 98/40990 | 9/1998 |
| WO | WO 99/28819 | 6/1999 |
| WO | WO 99/39481 | 8/1999 |
| WO | WO 99/46890 | 9/1999 |
| WO | WO 99/55056 | 10/1999 |
| WO | WO 99/57865 | 11/1999 |
| WO | WO 99/57866 | 11/1999 |
| WO | WO 99/65183 | 12/1999 |
| WO | WO 99/66400 | 12/1999 |
| WO | WO 00/27092 | 5/2000 |
| WO | WO 00/58804 | 10/2000 |
| WO | WO 2004/017658 | 2/2004 |
| WO | WO 2004/100499 | 11/2004 |

OTHER PUBLICATIONS

Aceves, Wireless Internet Gateways (Wings), Proc. IEEE MILCOM '97, Monterey, California, Nov. 1997.
Ascend Communications and ATCOM/INFO Announce Development Alliance, Jun. 22, 1999, Business Wire.
Agrawal, Swan: A Mobile Multimedia Wireless Network, IEEE Personal Communications, Apr. 1996.
Alexander, Active Bridging, University of Pennsylvania Technical Report No. MS-CIS-97-02, Jan. 1997.
Alonso, Database system issues in nomadic computing; Proceedings of the 1993 ACM SIGMOD International Conference on Management of Data, May 26, 1993.
Altmann, (Workshop '99) Assisting Users in Complex Purchasing Decisions, Jan. 12, 1999.
Altmann, Index Project: User support for buying QoS with regard to user's preferences, Sixth International Workshop on Quality of Service, May 18, 1998.
Amadio, Modelling IP Mobility, Nov. 1997.
Anderson, et al., The Magicrouter, an Application of Fast Packet Interposing, dated May 17, 1996 in 12 pages.
Aoyama, The Cost of Adaptivity and Virtual Lanes in a Wormhole Router, 1995.
Appenzeller, et al., "User-Friendly Access Control for Public Network Ports," Department of Computer Science, Stanford University, dated Aug. 31, 1998 in 16 pages.
ATCOM/INFO and Microsoft Plan Large-Scale Deployment of IPORT for Mid-1998, available at http://www.microsoft.com/presspass/press/1998/mar98/ipttrlpr.mspx.
ATCOM/INFO to Display High-Speed Plug- And-Play Internet Access Software with Microsoft at HITEC, Jul. 22, 1999.
ATCOM/INFO'S IPORT Brings High Speed Internet Access to Hotels in Japan and Mexico; ATCOM and Tut Systems Partner to Expand International Presence of 'Plug and Play' Internet Access, May 11, 1999.
Atkins, Internet Security Professional Reference; IP Spoofing and Sniffing, Ch. 6, 1996.
Atreus Systems Corporations and B2B Connect, In. Partner to Deliver Bundled Broadband Services to Mult-Tenant, High Ri Buildings, Feb. 14, 2000, Business Wire.
Babbage, Internet phone—changing the telephony paradigm?, BT Technology Journal, vol. 15, lss. 2, Apr. 1997.
Badrinath, To Send or not to Send: Implementing Deferred Transmissions in a Mobile Host, Proceedings of 16th International Conference on Distributed Computing Systems, May 27, 1996.
Bagrodia, Vision, Issues, and Architecture for Nomadic Computing, IEEE Personal Communications, Dec. 1995.
Baker, Local Control Over Filtered WWW Access, Fourth International World Wide Web Conference, Dec. 13, 1995.
Baker, M., et al.: Supporting Mobility in MosquitoNet, Proceedings of the 1996 USENIX Technical Conference, San Diego, CA Jan. 1996.
Baker, RFC 1812; Requirements for IP Version 4 Routers, Jun. 1995.
Barnes, Defense Data Network Usage Accounting Enhancement Approaches, Apr. 1989.
Beermann, C.; Re: Support for cern like Pass/Fair proxy limits?; 2 pages; available at <http://www.squid-cache.org/mail-archieve/squiq-users/199611/0385.html> (visited Feb, 1, 2005).
Beigl, System Support for Mobile Computing, Computers & Graphics, vol. 20, Iss. 5, Sep. 1996.
Berkowitz, Howard C.: PIER Working Group, Router Renumbering Guide, Aug. 1996, http://tools.ietf.org/pdf/draft-ietf-pier-rr-02.pdf.
Bhagwat, P., Charles Perkins, Satish Tripathi; Network Layer Mobility: An Architecture and Survey, IEEE Personal Communications, vol. 3, iss. 3, pp. 54-64; Jun. 1996.
Bieszczad, Towards plug-and-play networks with mobile code, Proceedings of the International Conference for Computer Communications ICCC'97, Mar. 1997.
Bjorn, The Case for Quality of Service on Demand Empirical Evidence from the INDEX Project, ISQE'99, Workshop on Internet Service Quality Economics, Cambridge, MA, USA, Dec. 1999.
Blackwell, Secure Short-Cut Routing for Mobile IP, Proceedings of the USENIX Summer 1994 Technical Conference on USENIX Summer 1994 Technical Conference, Jun. 10, 1994.
Bojorquez, Victor, CheckPoint Software Tech. LTD., How to Configure Firewall-1 With Connect Control, Oct. 10, 1999.
Borella et al., IETF Internet-Draft—Distributed Network Address Translation, Internet Engineering Task Force, Oct. 1998.
Boutell, CGI Programming in C & Perl, 1996.
Braden, et al., "Requirements for Internet Gateways", RFC 1009, Jun. 1987.
Braden, RFC 1122 Requirements for Internet Hosts—Communication Layers, Oct. 1989.
Brattli, The Software Network, Providing Continuous Network Connectivity for Multihoming Mobile Computers, Dec. 16, 1996.
Broman, Implementation and Analyses of the Mobile-IP Protocol, Jan. 25, 1996.
Brown, A Strategic Plan for Ubiquitous Laptop computing, vol. 41, No. 1, Communications of the ACM, Jan. 1998.
Brown, M-TCP: TCP for Mobile Cellular Networks, Jul. 29, 1997.
Bush, Mobile ATM Orderwire and Network Configuration, 1996.
Caceres, Fast & Scalable Handoffs for Wireless Internetworks, Proceedings of the 2nd annual international conference on Mobile computing and networking, Nov. 1996.
Caronni et al., Efficient Security for Large and Dynamic Multicast Groups, Jun. 1998.
Case No. 07-1946 GPS (VBK) *Nomadix, Inc.* v. *Second Rule LLC*, Expert Report of Peter Alexander, Ph.D., Regarding Invalidity of U.S. Patent No. 6,130,892; 7,088,727; 6,636,894; 6,857,009, and 6,868,399.
Case No. 04CV1485 BTM (POR): *IP3 Networks, Inc.* v *Nomadix, Inc.* - Jul. 23, 2004 Complaint for: (1) Declaratory Judgment of Patent Non-Infringement and Invalidity of U.S. Patent No. 6,636,894; (2) Declaratory Judgment of Patent Non-Infringement of U.S. Patent No.
Case No. 04CV1485 BTM (POR): *IP3 Networks, Inc.* v *Nomadix, Inc.* - Sep. 20, 2004 Amended Complaint for: (1) Declaratory Judgment of Patent Non-Infringement and Invalidity of U.S. Patent No. 6,636,894; (2) Declaratory Judgment of Patent Non-Infringement of U.S. P.
Case No. 04CV1485 BTM (POR): *IP3 Networks, Inc.* v *Nomadix, Inc* Oct. 21, 2004 Answer and Counterclaims of Nomadix, Inc. to the Amended Complaint.
Case No. 04CV1485 BTM (POR): *IP3 Networks, Inc.* v *Nomadix, Inc.*, Plaintiff/Counter—Defendant IP3 Networks Inc.'s Reply to Defendant Nomadix, Inc.'s Counter-claim, dated Nov. 15, 2004.
Case No. 07-1946 GPS (VBK) *Nomadix, Inc.* v. *Second Rule LLC*, Complaint for Patent Infringement of U.S. Patent No. 6,130,892; 7,088,727; 6,636,894; 6,857,009, and 6,868,399 dated Mar. 23, 2007.

(56) References Cited

OTHER PUBLICATIONS

Case No. 07-1946 GPS (VBK) *Nomadix, Inc. v. Second Rule LLC*, First Amended Answer, Affirmative Defenses and Counterclaims of Second Rule LLC, Jul. 16, 2007.
Case No. 07-1946 GPS (VBK) *Nomadix, Inc. v. Second Rule LLC*, Plaintiff's Reply to Defendants First Amended Answer and Counterclaims and Demand for Jury Trial, Jul. 31, 2007.
Case No. 07-1946 GPS (VBK) *Nomadix, Inc. v. Second Rule LLC*, Defendant's Initial Disclosure of Prior Art dated Jan. 18, 2008.
Case No. 07-1946 GPS (VBK) *Nomadix, Inc. v. Second Rule LLC*, Defendant's Response to Plaintiff's Claim Chart, dated Feb. 19, 2008.
Case No. 07-1946 GPS (VBK) *Nomadix, Inc. v. Second Rule LLC*, Defendant's First Supplemental Response to Plaintiff's Claim Chart dated Apr. 18, 2008.
Case No. 07-1946 DDP (VBKx) *Nomadix, Inc. v. Second Rule LLC*, Proposed Joint Claim Construction Statement dated Jul. 2, 2008.
Case No. 07-1946 DDP (VBKx) *Nomadix, Inc. v. Second Rule LLC*, Declaration of Don P. Foster re: Second Rule LLC's Opening Claim Construction Brief, dated Aug. 4. 2008.
Case No. 07-1946 DDP (VBKx) *Nomadix, Inc. v. Second Rule LLC*, Declaration of Mark Lezama in Support of Nomadix, Inc.'s Opening Claim Construction Brief, dated Aug. 4. 2008.
Case No. 07-1946 DDP (VBKx) *Nomadix, Inc. v. Second Rule LLC*, Defendant's Opening Claim Construction Brief, dated Aug. 4. 2008.
Case No. 07-1946 DDP (VBKx) *Nomadix, Inc. v. Second Rule LLC*, Plaintiff's Opening Claim Construction Brief, Redacted Public Version, dated Aug. 4. 2008.
Case No. 07-1946 DDP (VBKx) *Nomadix, Inc. v. Second Rule LLC*, Declaration of Don P. Foster Re: Second Rule LLC's Reply to Plaintiff's Opening Claim Construction Brief, dated Aug. 22, 2008.
Case No. 07-1946 DDP (VBKx) *Nomadix, Inc. v. Second Rule LLC*, Declaration of Douglas G. Muehlhauser in Support of Nomadix Inc.'s Claim Construction Brief, dated Aug. 22, 2008.
Case No. 07-1946 Ddp (VBKx) Nomadix, Inc. v. Second Rule Llc, Declaration of Mark Lezama in Support of Nomadix, Inc.'s Reply Claim Construction Brief, dated Aug. 22, 2008.
Case No. 07-1946 DDP (VBKx) *Nomadix, Inc. v. Second Rule LLC*, Defendant's Reply to Plaintiff's Opening Claim Construction Brief, dated Aug. 22, 2008.
Case No. 07-1946 DDP (VBKx) *Nomadix, Inc. v. Second Rule LLC*, Reply Claim Construction Brief, dated Aug. 22, 2008.
Case No. 07-1946 DDP (VBKx) *Nomadix, Inc. v. Second Rule LLC*, Declaration of Peter Alexander, Ph.D. In Support of Second Rule, LLC for Partial Summary Judgement dated Sep. 4, 2008.
Case No. 07-1946 DDP (VBKx) *Nomadix, Inc. v. Second Rule LLC*, Declaration of Don P. Foster Re: Motion of Second Rule, LLC for Partial Summary Judgement dated Sep. 5, 2008.
Case No. 07-1946 DDP (VBKx) *Nomadix, Inc. v. Second Rule LLC*, Defendant's Statement of Uncontroverted Facts and Conclusions of Law in Support of Defendant's Partial Summary Judgement dated Sep. 5, 2008.
Case No. 07-1946 DDP (VBKx) *Nomadix, Inc. v. Second Rule LLC*, Memorandum of Law in Support of Motion of Second Ruel, LLC for Partial Summary Judgement dated Sep. 5, 2008.
Case No. 07-1946 DDP (VBKx) *Nomadix, Inc. v. Second Rule LLC*, Claim Construction Order dated Oct. 3, 2008.
Case No. CV 09-8441 (C.D. Cal. 2009), *Nomadix, Inc. v. Hewlett-Packard Co.*, Complaint filed Nov. 17, 2009.
Case No. CV 10-0381 (C.D. Cal. 2010), *Nomadix, Inc. v. Solutionlnc Technologies Ltd.*, Complaint filed Jan. 19, 2010.
Nomadix, Inc.'s Disclosure of Asserted Claims and Infringement Contentions, *Nomadix, Inc. v. Hewlett-Packard Company et al.*, No. CV09-08441 DDP (VBKx), May 24, 2010.
Defendants' Joint Invalidity Contentions, *Nomadix, Inc. v. Hewlett-Packard Company et al.*, No. CV09-08441 DDP (VBKx), Jul. 1, 2010.
Plaintiff's Preliminary Invalidity Contentions and Accompanying Document Production, *Nomadix, Inc. v. Hewlett-Packard Company et al.*, No. CV09-08441 DDP (VBKx), Jul. 1, 2010.
Defendants' Supplemental Joint Invalidity Contentions, *Nomadix, Inc. v. Hewlett-Packard Company et al.*, No. CV09-08441 Ddp (VBKx), Jul. 15, 2010.
Plaintiff's Preliminary Invalidity Contentions and Accompanying Document Production Regarding U.S. Patent Nos. 6,996,073 and 7,580,316, *Nomadix, Inc. v. Hewlett-Packard Company et al.*, No. CV09-08441 DDP (VBKx), Jul. 15, 2010.
Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limited*, Case No. 2:10-CV-00381 DDP (VBKx), (Central District of Californi.
Exhibit A, Asserted Claims, filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limited*, Case No. 2:10-CV-00381 DDP (.
Exhibit B, Supplemental Prior Art List filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limited*, Case No. 2:10-CV-.
Exhibit C1, Claim Comparison for U.S. Patent No. 6,130,892 filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limite.
Exhibit C2, Claim Comparison for U.S. Patent No. 7,088,727 filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limite.
Exhibit C3, Claim Comparison for U.S. Patent No. 7,554,995 filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limite.
Exhibit C4, Claim Comparison for U.S. Patent No. 6,636,894, filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limit.
Exhibit C5, Claim Comparison for U.S. Patent No. 7,194,554 filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limite.
Exhibit C6, Claim Comparison for U.S. Patent No. 6,868,399 filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limite.
Exhibit C7, U.S. Patent No. 7,689,716 filed in Defendants' Supplemental Joint Invalidity Contentions, *NOMADIX, Inc. v. Hewlett-Packard Company, et al.*, Case No. 09-CV-8441 DDP (VBKx) and *NOMADIX, Inc. v. Solutionic Technologies Limited*, Case No. 2:10-CV-0.
Casey, Realizing Mobile Computing Personae, Ph.D. Thesis, Oct. 1995.
Chapman, D. B., et al.: "Building Internet Firewalls," O'Reilly & Associates, Inc., 103 Morris Street, Suite A Sebastopol, CA 95472, IP3 002885-002944; dated Sep. 1995.
Chapman, Network (In)Security Through IP Packet Filtering, Proceedings of the Third USENIX UNIX Security Symposium, Sep. 1992.
Chatel, M.: Classical versus Transparent IP Proxies (RFC1919), published as an RFC by ISOC on Mar. 1, 1996.
Check Point Ad, Sep. 14, 1998.
Check Point FireWall-I White Paper, v.3, Jun. 1997.
Check Point Software Delivers Breakthrough Security Advancements with Firewall-1 3.0, Oct. 7, 1996.
Check Point SoftwareCheck Point Firewall-I 4.0 Gains Int'l Recognized ITSEC Security Cert., Nov. 9, 1998.
Cheshire, Internet Mobility 4x4, Mobility: Processes, Computers, and Agents, SIGCOMM '96, Aug. 30, 1996.
Cheswick, The Design of a Secure Internet Gateway, Apr. 20, 1990.
Chikarmane, V., Rick Bunt, Carey Williamson; Mobile IP-based Multicast as a Service for Mobile Hosts; Proceedings of the 1995 Workshop on Physics and Computer Modeling; Jun. 5-6, 1995.

(56) References Cited

OTHER PUBLICATIONS

Chikarmane, Multicast Support for Mobile Hosts Using Mobile IP, May 16, 1997.
Chikarmane, Network Support for Mobile Hosts in a TCP/IP internetwork, Aug. 1995.
Cho, An Efficient Location and Routing Scheme for Mobile Computing Environments, IEEE Journal on Selected Areas in Communications, 1995.
Cisco, "Single-User Network Access Security TACACS+", Mar. 30, 1995, 9 pages, Cisco White Paper; XP992124521.
Cisco Systems, Inc., LocalDirector Quick Start Guide and User Reference Manual, Version 1.0, Jul. 1996.
Cisco, High-Performance Stateful Firewall Delivers Unparalleled Security, PIX Firewall Data Sheet, 1996.
Cobb, Universal Mobile Addressing, IEEE Workshop on Mobile Computing Systems and Applications, 1994.
Collier, Netlets: The Future of Networking, Apr. 4, 1998.
Comer, An Architecture for a Campus-Scale Wireless Mobile Internet, Purdue University Department of Computer Science Technical Report No. CSD-TR 95-058, Sep. 1995.
Comer, "Internetworking with TCP/IP vol. 1, Chapter 10, Principles, Protocols, and Architecture," 3rd ed., Prentice Hall 1995.
Copper Mountain Introduces CopperPowered Hotel Initiative to Deliver Cost-effective Always-on or Usage-based Broadband Access to Hotel Guests, Dec. 6, 1999, Business Wire.
Dahm, Redirecting your visitors, May 1999.
Damani, ONE-IP: techniques for Hosting a Service on a Cluster of Machines, Jun. 29, 2004.
Deering et al., Network Working Group RFC 966—Host Groups: A Multicast Extension to the Internet Protocol, Dec. 1985.
Desrosiers, Transparent Access of Remote Resources, IBM Technical Disclosure Bulletin, vol. 27, No. 7B, p. 4230, Dec. 1984.
Devivo, Internet Security Attacks at the Basic Levels, ACP SIGOPS Operating Systems Review, vol. 32, lss. 2, Apr. 1998.
Droms, R., Dynamic Host Configuration Protocol, Oct. 1993, 1 page, Network Working Group, Request for Comments 1541.
Droms, R., Dynamic Host Configuration Protocol, Mar. 1997, 1 page, Network Working Group, Request for Comments 2131.
Duda, Mobile Agent Architecture for Nomadic Computing, International Conference on Computer Communications, Cannes, 1997.
Edell, R. J. et al., "Billing Using and Pricing for TCP", IEEE Journal on selected areas in communications, US, IEEE Inc. New York, vol. 13, NR . 7, pp. 1162-1175; XP000525655; ISSN: 0733-8716, Apr. 15, 1995.
Edell, Demand for Internet Access: What we learn from the Index trial, Mar. 13, 1999.
Edell, Internet Demand Experiment: Technology and Market Trial, Ph.D. Thesis, Spring, 2001.
Egevang, IP Network Address Translator, Network Working Group RFC 1631, pp. 1-10, May 1994.
Elastic Networks Unveils YesWare; Mobility Software Solution Target Visitor-Based Networking; PRNewswire, Apr. 12, 1999.
Elton, Peter: "Linux as a Proxy Server", Linus Journal Archive, vol. 1997, Issue 44 (Dec. 1997) Article 3, ISSN: 1075-3583, ("Eldon07") See http://portal.acm.org/citation.cfm?id=327077.327080.
Estrin, Inter-organization networks: implications of access control: requirements for interconnection protocol, ACM SIGCOMM Computer Communication Review, vol. 16, Iss. 3, Aug. 1986.
Felten, Web Spoofing: An Internet Con Game, Princeton University Technical Report No. 540-96, Feb. 1997.
Fielding, RFC 2068 Hypertext Transfer Protocol HTTP 1.1, Jan. 1997.
Ford, Securing a Mobile Internet, Oct. 7, 1999.
Fujino, N. et at, "Mobile information service based on multi-agent architecture", (1997), IEICE Transactions on Communications, JP, Institute of Electronics Information and Comm. Eng. Tokyo, vol. E8C-B, NR. 10, pp. 1401-1406; XP000734533; ISSN: 0916-8516.
Furnell et al., A Security Framework for Online Distance Learning and Training, 1998.
Gao, Q., Anthony Acampora; A Virtual Home Agent Based Route Optimization for Mobile IP; 2000 IEEE Wireless Communications and Networking Conference; pp. 592-596; Sep. 23-28, 2000.
Giovanardi, Transparent Mobile IP: An Approach and Implementation, Global Telecommunications Conference, 1997, Nov. 3, 1997.
Google Groups: "home network" laptop; Aug. 3, 2004; IP3 002769-70; Newsgroups: comp.sys.sun.admin. Newsgroups: comp.sys.sun.admin.
Google Groups: netswitcher; Aug. 2, 2004; IP3 002516; Newsgroups: comp.os.ms-windows.networking.win95.
Google Groups: network configuration laptop packets; Aug. 2, 2004 IP3 002765-66; Newsgroups: comp.protocols.tcp-ip.
Google Groups: network laptop settings, Jul. 30, 2004; IP# 002467-68; Laptop on Dual Networks; Newsgroups: comp.os.ms-windows.nt.admin.networking.
Google Groups: network settings DHCP mobile, Aug. 3, 2004 IP3 002511-15; Newsgroups: comp.sys.mac.comrn.
Google Groups: redirect "login page" Jul. 28, 2004; IP 3 002873-74; Newsgroups: microsoft.public.inetserver.iis.activeserverpages.
Google Groups: View Thread, Aug. 2, 2004, IP3 002505-06; Newsgroups: microsoft, public.win95.networking.
Google Groups: View Thread, Aug. 2, 2004, IP3 002507-10; Newsgroups: comp.os.os2.networking.tcp-ip.
Grant, TACACS+ Protocol Version 1.75 Internet Draft (TACACS+)/ RFC1492, Oct. 1996.
Gray, Mobile Agents for Mobile Computing, May 2, 1996.
Guerin, RadioNet Driver Implementation for the Mobile Internet Router, Jun. 1994.
Gupta, A Client Oriented IP Level Redirection, M.S. Thesis, Aug. 1998.
Gupta, Firewall Traversal for Mobile IP, Mar. 17, 1997.
Gupta, Secure and mobile networking, Mobile Networks and Applications, vol. 3, Iss. 4, 1998.
Gupta, Solaris Mobile IP: Design and Implementation, Feb. 17, 1998.
Haas, Mobile-TCP: An Asymmetric Transport, Proceedings of ICC'97—International Conference on Communications, Jun. 1997.
Hance, Product Information—Netswitcher, the ultimate windows network setup utility; IP 3 002517; Netswitcher.TM., Developed and Marketed by: J.W. Hance, 1950-18 E. Greyhound Pass, Suite 305, Carmel, Indiana 46033 USA, Aug. 2, 2004.
Harrison, Mobile Multicaset (MoM) Protocol, Proceedings of the 3rd annual ACM/IEEE international conference on Mobile computing and networking, Sep. 26, 1997.
Heberlein, Attack Class: Address Spoofing, Proceedings of the Nineteenth National Information Systems Security Conference, Oct. 1996.
Heilbronner, S.: "Requirements for Policy-Based Management of Nomadic Computing Infrastructions," Proc. of the Sixth Workshop of the HP Openview University Association (HPOVUA '99), Bologna, Italy, Jun. 1999.
Heilbronner, Nomadic Computing Systems on the Internet—Infrastructure and Management Requirements, Mar. 31, 1997.
Hills, Wireless Data Network Infrastructure at Carnegie Mellon University, Feb. 1996.
Hinrichs, Susan: "Policy-Based Management Bridiging the Gap", Dec. 6, 1999; pp. 209-218; Computer Security Applications Conference, 1999 (ACSAC 1999), Proceedings, 15th Annual Phoenix, Arizona, USA Dec. 6110, 1999, Los Alamitos, California, IEEE Comp.
Hodes, Composable Ad-hoc Mobile Services for Universal Interaction, Aug. 2, 1997.
Hotel Online Special Report, Internet Access for the Road Warrior Easier Than Ever IPORT Version 2.0 Released, available at http://www.hotel-online.com/News/Press Releases19983rd/July98_IPORTAccess.html, dated Nov. 14, 2007, 2 pages.
Hotelier, ATCOM/INFO Makes High-Speed Internet Access to Corporate Networks Secure for Business Travelers, Jul. 17, 1999.
Housel, WebExpress: A Client/intercept based system for optimizing Web browsing in a wireless environment, Mobile Networks & Applications, vol. 3, No. 4, Jan. 1999.
Hubbard, Firewalling the Net, BT Technology Journal, vol. 15, Iss. 2, Apr. 1997.

(56) References Cited

OTHER PUBLICATIONS

Industry-Leading Internet Access System Now Makes Plug and Play—High-Speed Internet Access for the Road Warrior Easier Than Ever, Jul. 20, 1998.
Information Sciences Institute; Internet Protocol, DARPA Internet Program, Protocol Specification; Sep. 1981; 45 pages; available at <http://www.faqs.org/rfcs/rfc791.html> (visited 0002-Jan. 2005).
Inouye, Dynamic Network Reconfiguration Support for Mobile Computers, Proceedings of the 3rd annual ACM/IEEE international conference on Mobile computing and networking, Sep. 26, 1997.
Inouye, Physical Media Independence: System Support for Dynamically Available Network Interfaces, Jan. 20, 1997.
Internet Access: ATCOM/INFO Releases IPORT Central Office Solution. IPORT-CO Makes Plug & Play High-Speed Internet Access Possible too Multiple Properties from a Single Server-Product Announcement, ATCOM-IPORT Press Release Oct. 26, 1998.
Internet is the Key, as the Integration of Locations and their Information Begins, Nikkei Electronics, Jul. 13, 1998.
Ioannidis, IP-based Protocols for Mobile Internetworking, Proceedings of the Conference on Communications Architecture & Protocols, Sep. 3, 1991.
Ioannidis, Protocols for Supporting Mobile IP Hosts, Jul. 1992.
ipfwadm-2.3.0, source code module ipfwadm.c, Jul. 30, 1996.
IPORT Central Office Solution, Nov. 1998, pp. 1-20.
Jain, PC-notebook based mobile networking: Algorithms, architectures and implementations; 1CC95 vol. 2, Jun. 1995.
Johnson, Mobile Host Internetworking Using IP Loose Source Routing, Carnegie Mellon University Technical Report No. CS-93-128, Feb. 1993.
Johnson, Protocols for Adaptive Wireless and Mobile Networking, Feb. 1996.
Johnson, Scalable and robust internetwork routing for mobile hosts, Proceedings of the 14th International Conference on Distributed Computing Systems, Jun. 21, 1994.
Johnson, Scalable Support for Transparent Mobile Host Internetworking, Wireless Networks, vol. 1, Iss. 3, 1995.
Kaashoek et al., Efficient Reliable Group Communication for Distributed Systems, Jul. 1992.
Katz, The Bay Area Research Wireless Access Network (BARWAN), Proceedings of the 279 Katz, The Bay Area Research Wireless Access Network (BARWAN), Proceedings of the 41 st IEEE International Computer Conference, Feb. 25-28, 1996.
Kent et al., RFC 2401—Security Architecture for the Internet Protocol, Network Working Group, Nov. 1998.
Kleinrock, L.: "Nomadicity in the NII", Computer Science Department, UCLA, Los Angeles, CA; Cross-Industry Working Team Papers & Reports, Pub. Date: Jun. 1995.
Kleinrock, L.: "Nomadic Computing", Computer Science Department, UCLA, Los Angeles, CA; Information Network and Data Communication IFIP/ICCC International Conference on Information Network and Data Communication Pub. Date: Jun. 1996, Trondheim, Norway.
Kleinrock, L.: "Nomadicity: Anytime, Anywhere in a Disconnected World", Computer Science Department, UCLA, Los Angeles, CA; Mobile Network and Applications, Special Issue on Mobile Computing and System Services Pub. Date Dec. 1996, vol. 1, Issue 4.
Kleinrock, L.: "Nomadic Computing—An Opportunity", Computer Science Department, UCLA, Los Angeles, CA; ACM SIGCOMM, Computer Communications Review, Pub. Date: Jan. 1995, vol. 25, Issue 1.
Kleinrock, L.: "Nomadic Computing" (Keynote address) *Int'l Conf. on Mobile Computing and Networking*, Nov. 1995, Berkley, California, ACM.
Koblas, Socks, Proceedings of the Third USENIX UNIX Security Symposium (Baltimore, MD: USENIX Association), Sep. 1992.
Kostick, Building a Linux Firewall (Linux Journal 24), Apr. 1, 1996.
Kostick, C.: "IP Masquerading with Linux", Linux Journal Issue 27, Jul. 1996 ("Kostic96") See http://delivery.acm.org/10.1145/330000/325560/a3-kostick.html?key1=325560&key2=59... Oct. 16, 2008.
Kostick, "System Administration, IP Masquerading Code Follow-up, vol. 1997, Iss. 43, Nov. 1997 (This is a follow-up article to the author's 'IP Masquerading with Linux', in Linux Journal Issue 27)".
Kruus, Peter S., A Survey of Multicast Security Issues and Architectures, 1998.
Kuri, Jurgen, Gruppenreise Ins Internet Gemeinsamer Internet—Zugang durch das LAN, 1998.
Kunzinger, Network Layer Mobility: Comparison of CDPD and Mobile-IP, IBM Technical Report 29.2003, 1995.
La Porta, Challenges for nomadic computing: Mobility management and wireless communications, Mobile Networks and Applications, vol. 1, Iss. 1, Aug. 1996.
Lain Langdon, Education for Changing Times—An Online Learning Framework, Oct. 15, 1996.
Lear, RFC 1627, Network 10 Considered Harmful, Jul. 1994.
Lee, Adaptive Network Support for Mobile Multimedia, Proceedings of the 1st annual international conference on Mobile computing and networking, Nov. 13, 1995.
Leech, RFC 1928; Socks Protocol Version 5, Mar. 1996.
Leu, Implementation considerations for Mobile IP, Proceedings of the 21st International Computer Software and Applications Conference, Nov. 11, 1997.
Leveridge, Campus World and BT's On-Line Education Services, BT Technology Journal, Apr. 1997.
Li and Leung, Supporting Personal Mobility for Nomadic Computing Over the Internet, ACM SIGMOBILE Mobile Computing and Communications Review, Apr. 1997.
Lin, An Architecture for a Campus-Sized Wireless Mobile Network, Ph.D. Thesis, Dec. 1996.
Lioy, Providing TCP-Level Services to Mobile Computers, M.S. Thesis, 1997.
Liu, D.: "Automatically Configure a System to Route Internet Traffic to a Proxy," originally disclosed y IBM on Apr. 1, 1999 UTC, RD v42 n420 Apr. 1999 article 42099.
Lo et al., IETF Internet-Draft—Realm Specific IP: A Framework, Internet Engineering Task Force, Feb. 1999.
Loeb, S.: "Interactive Billing for Broadband and Multimedia Services," Community Networking, 1995. Pub. Date: Jun. 20-22, 1995, Princeton, NJ.
Loon, Alleviating the Latency and Bandwidth Problems in WWW Browsing, Proceedings of the USENIX Symposium on Internet Technologies and Systems on USENIX Symposium on Internet Technologies and Systems, Dec. 8, 1997.
Luotonen. A. et al.; World-Wide Web Proxies; Apr. 1994; 8 pages.
Maceachern, D.; Apache/Perl Integration Project; README; 2 pages; available at <http://apache.perl.org> ,<http://outside.organic.com/mail-archives/modperl>, and <http://www.ping.delfdclmodJlerl>.
Maciel, Dynamic Gateways: a novel approach to improve networking performance and availability on parallel servers, Apr. 21, 1998.
Macker, Mobile Ad Hoc Networking and the IETF, ACM SIGMOBILE Mobile Computing and Communications Review, vol. 3, Iss. 1, Jan. 1999.
Major telecom Company Launches Education Internet Service for Schools, Sep. 20, 1995.
Making the Most of Home Pages, E-mail, The Internet and Presentation Graphics, The Journal, Aug. 1, 1998.
Manuel Gunter, Virtual Private Networks over the Internet, Aug. 3, 1998.
Maruyama et al, "A secure LAN sockets system for everyone which need not modify existing DHCP clients", Study Report of Information Processing Society of Japan, Jul. 16, 1999, vol. 99, No. 56, pp. 131-136.
Messmer, "Gateway Handles Thorny Problems with Addressing IP Networks", Network World, p. No. 8, Nov. 28, 1994.
Messmer, New room-service fare: High-speed Internet access, Dec. 7, 1998.
Metz, C.: "AAA Protocols; Authentication, Authorization, and Accounting for the Internet," Internet Computing, IEEE, vol. 3, No. 6, pp. 75-79, Nov./Dec. 1999.
Moby Dick, The Mobile Digital Companion, LTR 20422, Jul. 1997.
Mod . . . perl.c; Copyright;1995—1997 The Apache Group; 20 pages.

(56) References Cited

OTHER PUBLICATIONS

Mogul, RFC 950; Internet Standard Subnetting Procedure, Network Working Group, Aug. 1985.
Moore, Campus World, 1998.
Myles, Comparison of Mobile Host Protocols for IP, Apr. 14, 1993.
Mysore, A New Multicasting-based Architecture for Internet Host Mobility, Sep. 26, 1997.
Nelson, Context-Aware and Location Systems, Jan. 1998.
NetGame Ltd. Announces its High-Speed, In-Room Hotel Internet Access Product to be Displayed at HITEC 99, Jun. 16, 1999, Business Wire.
Network Working Group Request for Comments: 1009—Requirements for Internet Gateways (Jun. 1987).
Network Working Group Request for Comments: 1027—Using ARP to Implement Transparent Subnet Gateways (Oct. 1987).
Network Working Group Request for Comments: 1034—Domain Names—Concepts and Facilities (Nov. 1987).
Network Working Group Request for Comments: 1531—Dynamic Host Confirmation Protocol (Oct. 1993).
Network Working Group Request for Comments: 1919—Classical Versus Transparent IP Proxies (Mar. 1996).
Network Working Group Request for Comments: 1945—Hypertext Transfer Protocol—HTTP/1.0 (May 1996).
Network Working Group Request for Comments: 826—Ehternet Address Resolution Protocol (Nov. 1982).
Network Working Group Request for Comments: 894—Standards for Transmission of IP Datagrams Over Ethernet Networks (Apr. 1984).
Network Working Group Request for Comments: 925—Mutli-LAN Address Resolution (Oct. 1984).
Network Working Group, The IP Network Address Translator (NAT) (May 1994) www.ftp.isi.edu/in-notes/rfc1631.txt.
Networking Working Group, Radius Accounting, Request for Comments: 21 39, Obsoletes: 2059; Category: Informational, C. Rigney, Livingston, Apr. 1997; IP 3 002991-003013.
Neves, Adaptive Recovery for Mobile Enviroments, Communications of the ACM, vol. 40, 155. 1, Jan. 1997.
Newman, Flow Labelled IP: A Connectionless Approach to ATM, Proceedings of the Conference on Computer Communications (IEEE Infocom), Mar. 24, 1996.
Nomadicity in the National Information Infrastructure, a white paper published by the Cross-Industry Working Team (XIWT) at http://www.xiwt.org/documents/Nomadicity.html., last update Jul. 12, 1999.
Peine, An Introduction to Mobile Agent Programming and the Ara System, University of Kaiserslautern Technical Report ZRI-Report 1/97, 1997.
Perkins, C. E. et al.: "DHCP for mobile networking with TCP/IP" Proceeding IEEE International Symposium on Computer and Communications, Jun. 27, 1995, pp. 255-261, XP002132695.
Perkins, "Providing Continuous Network Access to Mobile Hosts Using TCP/IP." Computer Networks and ISDN Systems, Nov. 1993.
Perkins, A Mobile Networking System Based on Internet Protocol (IP) in USENIX Symposium on Mobile and Location-Independent Computing, Aug. 2, 1993.
Perkins, C. E. Ed—Insitute of Electrical and Electronics Engineers: "Mobile-AP, Ad-Hoc Networking, and Nomadicity" Proceedings of the 20th Annual International Computer Software and Applications Conference (COMPSAC). Seoul, Aug. 21-23, 1996, Proceedin.
Perkins, C.E., et al.: "A Mobile Networking System Based on Internet Protocol", Pers+B296ona1 Communications, IEEE< Pub. Date: 1st Qtr 1994, vol. 1, Issue 1.
Perkins, Highly Dynamic Destination-Sequenced Distance-Vector Routing (DSDV) for Mobile Computers, ACM SIGCOMM Computer Communication Review, vol. 24, Iss. 4, Oct. 1994.
Perkins, Internet Mobile Host Protocol (IMHP), Jun. 13, 1994.
Perkins, Mobile IP; Communications Magazine, IEEE vol. 35, Issue 5, May 1997.
Perkins, Mobile networking through Mobile IP, IEEE Internet Computing, Jan. 1998.
Perkins, RFC 2002: IP Mobility Support, Oct. 1996.
Perkins, Mobility Support in IPv6, Proceedings of the 2nd annual international conference on Mobile computing and networking, Nov. 10, 1996.
Perkins, et al., Resource discovery protocol for mobile computing, Mobile Networks and Applications 1 (1996) 447-455.
Pissinou, A middleware-based architecture to support transparent data access by mobile users in heterogeneous environments, Research Issues in Data Engineering, Feb. 28, 2000.
Pitoura, Building Information Systems for Mobile Environments, Proceedings of the third international conference on Information and knowledge management, Nov. 29, 1994.
Pitoura, Dealing with Mobility: Issues and Research Challenges; Purdue University Computer Science Department Technical Report CSD-TR-93-070, Nov. 1993.
PIX, Network Translation Inc., Private Internet Exchange (PIX) Technical White Paper (Network Address Translation and the Private Internet Exchange, 1994.
PIX, Network Translation Inc., Private Internet Exchange (PIX) Technical White Paper, May 16, 1995.
PIX, Network Translation Inc., Private Internet Exchange Reference Manual, Oct. 5, 1995.
Poger, Secure Public Internet Access Handler (SPINACH), Proceedings of the USENIX SYmposium on Internet Technologies and Systems, Dec. 8, 1997.
Polydorou, Performance Analysis and Comparison of Two Wireless Wide Area Networks, Dec. 1996.
Poslad, Software Agents for Future Communication Systems— Chapter 9: Agent-Oriented Middleware for Integrating Customer Network Services, 1999.
Postel, RFC 793, Transmission Control Protocol, Sep. 1981.
Rajagopalan, An Adaptive Location Management Strategy for Mobile IP, Proceedings of the 1st annual international conference on Mobile computing and networking, Nov. 13, 1995.
Rajagopalan, Mobile Internetworking Protocols for Wireless Networks with ATM Backbones, MILCOM '97 Conference Proceedings, Nov. 2, 1997.
Rao, A Proxy-Based Personal Portal, Proceedings of the WebNet99 Conference, Hawaii, Oct. 1999, p. 913.
Rao, iProxy: A Programmable Proxy Server, Poster Proceedings of the WebNet99 Conference, Oct. 1999, p. 1676.
Rao, A Proxy-Based Personal Web Archiving Service, ACM SIGOPS Operating Systems Review, Jan. 2001.
Redi, Mobile IP: A Solution for Transparent, Seamless Mobile Computer Communications, Upcoming Trends in Mobile Computing and Communications, Jul. 1998.
Rekhter, RFC 1597, Address Allocation for Private Internets, Mar. 1994.
Rekhter, RFC 1918, Address Allocation for Private Internets, Feb. 1996.
Rigney, RFC 2138, Remote Authentication Dial in User Service (RADIUS), Apr. 1997.
Rigney, RFC 2058, Remote Authentication Dial in User Service (RADIUS), Jan. 1997.
Rigney, RFC 2059, RADIUS Accounting, Jan. 1997.
Rizzo, A Dynamic Pricing Framework to Support a Scalable, Usage-based Charging Model for Packet-switched Networks, May 7, 1999.
Robinet, An implementation of a gateway for hierarchically encoded video across ATM and IP networks, Proceedings of the IFIP TC-6 Eigth International Conference on High Performance Networking, Sep. 21, 1998.
Rowe, Reliability of WWW Name Servers, Computer Networks and ISDN Systems, Apr. 1995.
Rupp, Index: A Platform for Determining how People Value the Quality of their Internet Access, Index Project Report #98-010P, May 1998.
Sandhu et al., Decentralized Group Hierarchies in UNIX: An Experiment and Lessons Learned, Oct. 1998.
Sato, Yutaka: "Details of Functions of Multi-purpose Proxy Server DeleGate-Access/Route Conrol and Protocol Conversion", Interface vol. 21, No. 9, p. 130-146, Sep. 1995.
Scale, How to Cost-Effectively Scale Web Servers, Packet Magazine, Third Quarter, 1996.

(56) References Cited

OTHER PUBLICATIONS

Schilit, A System Architecture for Context-Aware Mobile Computing, Ph.D. Thesis, May 1995.
Schoen, et al., "Convergence Between Public Switching and the Internet", published Sep. 21, 1997 in World Telecom Congress Proceedings, pp. 549-560.
Schooler, A Distributed Architecture for Multimedia Conference Control, Nov. 1991.
Shamsuddin, Positioning of Wireless Broadband, Jun. 1996.
Short, Joel E.: "Auto-Porting and Rapid Protyping with Application to Wireless and Nomadic Network Algorithms, A dissertation submitted in partial satisfaction of the requirement for the degree of Doctor of Philosophy in Computer Science," University of.
Short, Mobile Wireless Network System Simulation, Wireless Networks, vol. 1, Iss. 4, Nov. 1995.
Single-User Network Access Security TACACS+http://www.cisco.com/warp/public/614/7.html IP3 002876-002884; dated Aug. 10, 2005.
Smoot, Carl-Mitchell, et al., "Using ARP to Implement Transparent Subnet Gateways", RFC 1027, Oct. 1987.
Srisuresh et al., RFC 2663—IP Network Address Translator (NAT) Terminology and Considerations, Network Working Group, Aug. 1999.
Stevens, ARP: Address Resolution Protocol; TCP Illustrated, 1994.
Stevens, R, TCP Connection Handshake, 1994.
Stevens, W. R.; TCP/IP Illustrated, vol. 1—The Protocols; Addison-Wesley Professional Computing Series; pp. 53-62 and 231-235 (Printed Jul. 2001).
Stewart, J. N., Working with Proxy Servers; Mar. 1997; pp. 19-22; WebServer Magazine.
Sudan, Gateway Based Approach for Conducting Multiparty Multimedia Sessions over Heterogeneous Signaling Domains, Proceedings of the INFOCOM '97 Sixteenth Annual Joint Conference of the IEEE Computer and Communications Societies, Apr. 9, 1997.
Tanenbaum, Andrew S.: "Computer Networks", 1996, pp. 420-24, 3rd edition, prendice Hall of India, New Delhi, India.
Taylor, Internetwork Mobility The CDPD Approach, Jun. 11, 1996.
Team Internet Technical Specifications, Infomine Network Solutions and Services, Helena, Montana, Sep. 7, 1998.
Tennenhouse, D. L., Jonathan M. Smith, W. David Sincoskie, David 1. Wetherall, Gary J. Minden; A Survey of Active Network Research; IEEE Communications Magazine; Jan. 1997; pp. 80-86; IEEE.
Teraoka, A Network Architecture Providing Host Migration Transparency, ACM SIGCOMM Computer Communication Review, Sep. 1991.
Teraoka, Host Migration Transparency in IP Networks: The VIP Approach; ACM SIGCOMM Computer Communication Review, vol. 23, Iss. 1, Jan. 1993.
Teraoka, VIP: A Protocol Providing Host Mobility, Communications of the ACM, Aug. 1994.
The 'Security Digest' Archives, TCP-IP Distribution List, Aug. 1994, http://securitydigest.org/tcp-ip/archive/1994/08.
The Independent, Hardware hustle hits the classroom, May 20, 1996.
Thomsen, Mobile Agents—The new paradigm in computing, ICL Systems Journal, vol. 12, Issue 1, pp. 14-40, May 1997.
TIS Firewall Toolkit Overview, Jun. 30, 1994.
Troy, Timothy N., "Servicing with Software," Hotel & Motel Management, Sep. 20, 1993, p. 28, vol. 208, No. 16, Advanstar Communications, Inc.
Tsuchiya et al., Extending the IP Internet Through Address Reuse, ACM SIGCOMM Computer Communication Review, 1993.
Tut Systems Launches Hotel Internet Management System, PublicPort(TM) Latest Addition to Multi-Tenant Unit Product Line Allows Hotel Owners to Use Existing Copper Infrastructure to Provide 'Plug and Play' Internet Services, Jun. 23, 1999.
Universal Subscriber Gateway, Nomadix, Inc. 2701 Ocean Park Blvd., Suite 231, Santa Monica, California 90405.
USG Product Timeline, Nomadix, Inc. 2701 Ocean Park Blvd., Suite 231, Santa Monica, California 90405.
Valencia, RFC 2341, Cisco Layer Two Forwarding (Protocol) "L2F", May 1998.
Varaiya, Index Project Proposal—Executive Summary,Index Project Report #98-005P, Aug. 6, 1996.
Venema, TCP Wrapper; Network monitoring, access control, and booby traps, Proc. of the Third Usenix UNIX Security Symposium, USENIX Association, Sep. 1992.
Wahl, RFC 2256, A Summary of the X.500(96) User Schema for use with LDAPv3, Dec. 1997.
Webb, Automatic Redirection, Jun. 8, 1997.
Wessels, D.; Squid Proxy Server Configuration File 1.93.2.2, "TAG deny_info"; Mar. 1997; 19 pages; available at <http://www.squid-cache.org/mail-archieve/squid-users/199703/att0250/squid.conf> ; (visited Feb. 1, 2005).
Xylomenos, IP Multicast for Mobile Hosts, IEEE Communications Magazine, vol. 35, Iss. 1, Jan. 1997.
Yang, C., Jiing-Ching Yang, Kun-Da Wu, Jian-Xing Lee, Yuh-Rong Leu; An Efficient Multicast Delivery Scheme to Support Mobile IP; Proceedings of the 10th International Workshop on Database and Expert Systems Applications; 1999; 6 pages; IEEE Computer Socie.
Yeom, IP Multiplexing by Transparent Port-Address Translator, USENIX Tenth System Administration Conference, Sep. 29, 1996.
Zhao, Flexible Connectivity Management for Mobile Hosts, Stanford University Technical Report No. CSL-TR-97-735, Sep. 1997.
U.S. Appl. No. 60/072,175 by Brothers, filed Jan. 22, 1998.
U.S. Appl. No. 60/084,014, filed May 4, 1998; In re: Ikudome; entitled "User Specific Automatic Web Redirection System".
U.S. Appl. No. 09/295,966, filed Apr. 21, 1999.
U.S. Appl. No. 10/919,214, filed Aug. 16, 2004—file history of U.S. Publication No. 2005-0021943, published Jan. 27, 2005.
U.S. Appl. No. 11/645,924, filed Dec. 26, 2006—file history of U.S. Publication No. 2007-0294417, published Dec. 20, 2007.
U.S. Appl. No. 11/375,740, filed Mar. 14, 2006—file history of U.S. Publication No. 2006-0174019, published Aug. 3, 2006.
U.S. Appl. No. 08/816,174, filed Mar. 12, 1997.
Request for Reexamination, U. S. Pat. No. 6,130,892, filed Feb. 15, 2005.
U.S. Appl. No. 60/111,497 by Kleinrock, filed Dec. 8, 1998.
Office Action mailed Oct. 5, 2005, for U.S. Appl. No. 09/684,937, Oct. 5, 2005.
PCT Application and its English translation for Chinese Patent Application No. 98805023.4., Jan. 12, 2005.
Exam Report re App. No. EP 98 909 121.0, mailed Nov. 22, 2005.
International Search Report dated Jun. 15, 2001 for International Application No. PCT/US 00 28541, filed Oct. 16, 2000; Applicant— Nomadix, Inc., et al.
Arar, Y., Prepaid Internet Access Cards: Instant ISP, http://www.pcworld.com/article/5045/prepaid_internet_access_cards_instant_isp.html, PC World, Jul. 14, 1997, 2 pages.
"Auric Web Systems Unveils Software to Reduce Theoperating Costs of Internet Service Providers", http://www.allbusiness.com/technology/software-services-applications-internet/6971623-1.html, AllBusiness, Mar. 25, 1997, 2 pages.
Auric Web Systems, WebGate Card: FAQ, http://web.archive.org/web/19980520083043/http:/www.auricweb.com/faq.html, May 20, 1998, 5 pages.
Eventou, A., Anywhere Online Access, Auric Web Systems find many applications for its WEBGate card that's a prepaid key to Internet, Dec. 22, 1997, 1 page.
Auric Web Systems, InterACS: Internet Access Control System: Solutions for the Internet Service Provider, http://web.archive.org/web/19970708234615/http:/www.auricweb.com/InterACS.html, Jul. 8, 1997, 5 pages.

(56) References Cited

OTHER PUBLICATIONS

McKinley, R., Prepaid Internet Access Cards, http://www.cardtrak.com/news/1997/07/14/prepaid_internet_access_cards, CardTrak.com, Jul. 14, 1997, 1 page.

Auric Web Systems, The Intercard System Prepaid Internet Access Cards, http://web.archive.org/web/19970708234054/http:/www.auricweb.com/Accesscard.html, Auric Web Systems, Jul. 8, 1997, 4 pages.

First Claim Construction Order, *Nomadix, Inc. v. Hewlett-Packard Company et al.*, No. CV-09-08441 DDP (VBKx), filed Aug. 31, 2011 in 17 pages.

Second Claim Construction Order, *Nomadix, Inc. v. Hewlett-Packard Company, et al.*, No. CV-09-08441 DDP (VBKx), filed Oct. 24, 2011 in 19 pages.

SYSTEM AND METHOD FOR ESTABLISHING NETWORK CONNECTION

CROSS-REFERENCE TO RELATED APPLICATIONS

This application is a continuation of U.S. patent application Ser. No. 12/240,427, filed Sep. 29, 2008; which is a continuation of U.S. patent application Ser. No. 11/097,925, filed Apr. 1, 2005, now U.S. Pat. No. 7,554,995; which is a continuation of U.S. patent application Ser. No. 09/684,937, filed Oct. 6, 2000, now U.S. Pat. No. 7,088,727; which is a continuation-in-part of U.S. patent application Ser. No. 09/041,534, filed Mar. 12, 1998, now U.S. Pat. No. 6,130,892; which is a continuation-in-part of U.S. patent application Ser. No. 08/816,174, filed Mar. 12, 1997, now abandoned. All of the aforementioned applications are hereby incorporated by reference as if set forth herein in their entireties.

STATEMENT REGARDING FEDERALLY SPONSORED R&D

The U.S. government may have rights in this invention as provided for by the terms of Contract No. DAAH01-97-C-R179 awarded by DARPA.

BACKGROUND

The present invention is generally related to the art of network communications.

User digital communication addresses such as internet or IP addresses are conventionally associated with a fixed physical location, similar to a user's business telephone line. However, portable communication devices such as laptop computers are becoming increasingly popular, and it is common for a user to access the internet from locations as diverse as hotel rooms and airplanes.

Digital communication networks are set up to route communications addressed to a communication or network address to an associated destination computer at an established physical location. Thus, if a laptop computer is moved to a remote location, communications to and from the laptop computer may not reach the new physical location.

For a computer (host) to communicate across a network (e.g., the internet), software protocols (e.g., Transport Control Protocol/Internet Protocol (TCP/IP)) must be loaded into the host. A host computer sends information (i.e., packets of data) to another destination computer via devices on the network (routers) which receive the packets and send the packets to the network or segment of the destination host.

The destination host will route replies back using a similar process. Each host computer and router must therefore be configured to send the packets of data to an appropriate router to reach the intended destination. However, a router will receive the packets only if the host computers specifically send (address) the packets to that router at the link layer of the communication protocol. If a host is configured incorrectly (bad address or address of a router not on the local network), then the host computer and router will be unable to communicate, i.e., the router will not listen to the host or will "drop" packets.

With the advent of mobile computers (laptops) and the desire to plug them into various networks to gain access to the resources on the network and internet, a mobile computer must be reconfigured for each network. Traditionally this new configuration can be done either (i) manually in software on the mobile computer (usually causing the mobile computer to be restarted to load the new configuration), or (ii) with a new set of protocols which must be utilized on the mobile computer to obtain the configuration information from a device on the network to which the computer is being connected. When new services (protocols) are created to add functionality to the host computers, these new protocols may need to be updated in the host computers or routers, depending upon the type of new functionality being added.

SUMMARY

In accordance with the present invention, a "Nomadic" router or translator enables a laptop computer or other terminal which is configured to be connected to a local home network to be connected to any location on the internet or other digital data communication system. The nomadic router automatically and transparently reconfigures packets sent to/from the terminal for its new location by processing outgoing and incoming data.

The nomadic router includes a processor which appears as the home network to the terminal, and appears as the terminal to the communication system. The terminal has a terminal address, the nomadic router has a router address, and the terminal transmits outgoing data to the system including the terminal address as a source address. Whether or not the message is addressed to the nomadic router at the link layer, the processor intercepts the message and translates the outgoing data by replacing the permanent address with the router address as the source address. Incoming data intended for the terminal from the system includes the translator address as a destination address, and the processor translates the incoming data by replacing the translator address with the permanent address as the destination address.

The terminal can be directly connected to a point on a local network, and the nomadic router connected to another point on the network. The nomadic router can be employed to implement numerous applications including nomadic e-mail, network file synchronization, database synchronization, instant networking, a nomadic internet, mobile virtual private networking, and trade show routing, and can also be utilized as a fixed nomadic router in hotels, or multi-dwelling units, or multiple tenant units, for example.

The nomadic router can be implemented as software and/or hardware. The nomadic router establishes location and device transparency for a digital communication terminal such as a laptop computer. The terminal can be connected to any of a variety of networks and locations which can employ a variety of communication interface devices.

The nomadic router automatically converts the actual location address to a unique communication address for the user such as an internet address, such that the terminal performs communications originating from the communication address regardless of the physical location of the terminal.

The nomadic router includes software and services which can be packaged in a personal portable device to support a rich set of computing and communications capabilities and services to accommodate the mobility of nomads (users) in a transparent, integrated, and convenient form. This is accomplished by providing device transparency and location transparency to the user.

There is a vast array of communication device alternatives such as Ethernet, Wireless LAN, and dialup modem among which the user switches when in the office, moving around the office, or on the road (such as at a hotel, airport, or home). The device transparency in the nomadic router provides seamless switching among those devices (easily, transparently, intelligently, and without session loss). The location transparency support in the nomadic router prevents users from having to reconfigure (e.g., IP and gateway address) their network device (laptop) each time they move to a new network or subnetwork.

The nomadic router provides a separation of location and identity by providing a permanent IP address to the network device (host). The nomadic router provides independence between the location, communication device, and the host operating system. There are no new standards which need to be adopted by the networking community. All specialized processing is stored internally to the nomadic router with standard interfaces to the host device and various communication devices.

The nomadic router supports the migration to Network Computers by providing identity and security services for the user. The nomadic router also supports multiple parallel communication paths across the communications network for soft handoff, increased throughput, and fault tolerance by supporting multiple communication substrates.

A portable router for enabling a data communication terminal to be location and device transparent according to the present invention, comprises: a first module for storing a digital communication address of a user; a second module for detecting a data communication network location to which the terminal is connected; a third module for detecting communication devices that are connected to the terminal; a fourth module for establishing data communication between the terminal and the network such that the communication address of the location from the second module is automatically converted to the communication address of the user from the first module; and a fifth module for automatically selecting a communication device which was detected by the third module for use by the fourth module.

The nomadic router utilizes a unique process embodied in a self-contained apparatus which manipulates the packets of data being sent between the host computers and routers. This process provides an intelligent active universal translation of the content of the packets being transmitted between the host computer and nomadic router. The translation allows the host computer to communicate with the nomadic router, which intercepts packets from the host, even when the host computer is not configured to communicate with the nomadic router.

This is achieved by the nomadic router pretending to be the router for which the host is configured, and by the nomadic router pretending to be the host with which the router expects to communicate. Therefore, the nomadic router supports the mobility of computers in that it enables these computers to plug into the network at different locations (location independence) without having to install, configure, or utilize any net protocols on the mobile computer.

The mobile computer continues to operate without being aware of the change in location or configuration of the new network, and the nomadic router translates the data allowing the host to think that it is communicating with its home router. By putting this process in a self-contained apparatus, the deployment of new protocols can be performed independently of the host computer and its operating system (host independent).

All specialized processing and translation is stored internally in the nomadic router with standard interfaces to the host device and various communication devices. Thus, no new standards need be adopted. By removing the complexity of supporting different network environments out of the mobile computer and into this self-contained apparatus, the nomadic router allows the host computer to maintain a minimal set of software protocols and functionality (e.g., the minimum functionality typically installed in network computers) to communicate across the network.

The nomadic router translation ability also enables the use of alternate communication paths (device independence) without the host computer being aware of any new communication device that utilizes an alternate communication path. The translation of the packets is done not just at the physical, link, or network layer of the protocol stack but at the transport and application layers as well. This allows the network card, protocol stack, and application running on the host computer to be independent of the network environment and configuration.

As an example of the communication device independence, the translation allows soft handoff, increased throughput, and fault tolerance by supporting multiple communication substrates. In addition, the nomadic router translation ability provides a flexible process for deploying enhanced nomadic and mobile computing software and services such as filtering of packets and determining which packets should be allowed to be transmitted between the mobile computer and the nomadic router or local area network (Internal Firewall).

The router apparatus can be: (i) carried with the mobile user (e.g., using an external box); (ii) attached to the mobile computer (e.g., PCMCIA card); (iii) installed inside the mobile computer (e.g., a chip in the laptop); (iv) or installed into the remote network infrastructure to provide network access for any mobile computer (e.g., a box which plugs into the remote or foreign local area network translating packets being sent between the host and its router, or a chip which is installed in routers on the remote network). The nomadic router can also be provided in the form of software which is loaded into and run in the mobile computer or another computer or router on a network.

These and other features and advantages of the present invention will be apparent to those skilled in the art from the following detailed description, taken together with the accompanying drawings, in which like reference numerals refer to like parts.

DETAILED DESCRIPTION

Figure 1:
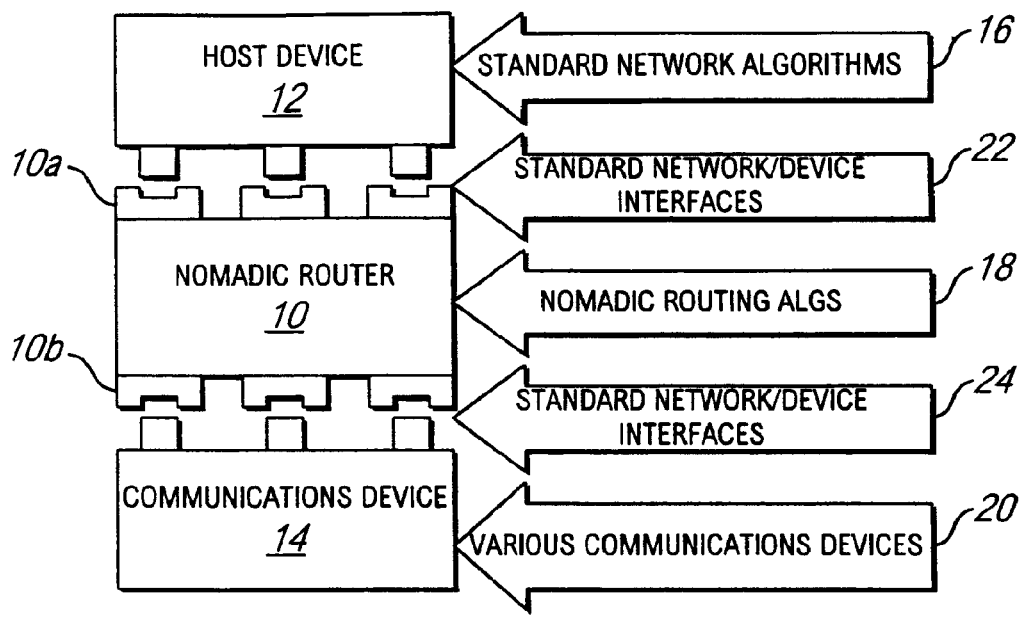
FIG. 1 is a diagram illustrating one implementation of a nomadic router positioned between the host computing device and various communication devices using standard interfaces.

FIG. 1 illustrates a "nomadic" translator or router 10 embodying the present invention as being connected between a host device or computer 12 and a communications device 14. Host device 12 is a laptop computer or other fixed or mobile digital data communication terminal which is sufficiently portable or mobile that it can be carried from one location to another. A laptop computer, for example, can be used in any convenient location such as an airplane, customer's office, home, etc.

Communications device 14 can be part of any type of communication system to which host computer 12 can be connected. Such communication systems include, but are not limited to, local networks, wide area networks, dial-up and direct internet communications, etc. In a typical application, the communications device will connect the host computer to a local network which itself is connected to the internet. Thus, host device 12 is able to communicate with an unlimited number of networks and nodes which are themselves interconnected with routers, switches, bridges, etc. in any known manner.

Router 10 includes a terminal interface 10a which normally is used to connect router 10 to host device 12, and a system interface 10b which connects router 10 to communications device 14. Router 10 generally includes a processor consisting of hardware and/or software which implements the required functionality. Router 10 is further configured to operate in an alternate mode in which host device 12 is connected directly to a network, and router 10 is also connected to a point in the network via system interface 10b. In this case, terminal interface 10a is unused.

Although device 10 is described herein as being a router, it will be understood that router 10 is not a conventional router in that it includes the capability for providing interconnectability between networks. Instead, router 10 is essentially a translator which enables host device 12 to be automatically and transparently connected to any communications device 14, and process incoming and outgoing data for device 12.

Host device 12 may be provided with a permanent internet address which conveniently need not be changed in accordance with the present invention. Device 12 is initially configured to communicate with a particular gateway or other home device at its base location. The gateway has a link layer address which device 12 attempts to locate when it is connected to any communication system. Without the functionality of nomadic router 10, host device 12 would not be able to operate at a remote location because it would not find its gateway.

It will be understood that the term "home" does not relate to a residence, but is the network, gateway or other communication device or system to which the terminal is normally connected and which corresponds to the home internet or IP address.

FIG. 1 further illustrates a top protocol layer 16 representing host computer device 12 which generates and consumes data that is transferred through communications device 14. Interface 16 is below the IP layer, and above the link layer in the typical OSI/ISO model. In the middle is a layer 18, which represents router 10, whose function is to adaptively configure and utilize the underlying communications device and provide router support. A lower layer 20 is a physical communication which carries out the communication (potentially wire-lined internet based, ad-hoc or wireless) as made available and determined for use by the nomadic router or user. Between router layer 18 and layers 16 and 20 are interfaces 22 and 24 which router 10 identifies and configures dynamically.

Figure 7A:
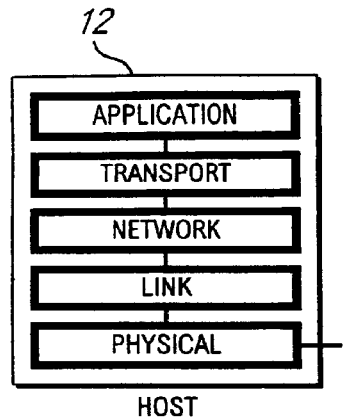
FIGS. 7A to 7G are diagrams illustrating protocol stack implementations for various network devices, with the translation function performed for all layers of the protocol stack in the nomadic router.

The present invention operates with host computers, routers, and other network devices through well-defined standard interfaces such as specified by the IETF (Internet Engineering Task Force) and IEEE standardization committees. These standards specify the packet format, content, and physical communication characteristics. As shown in FIG. 7A, host computers have to be configured at various layers of the protocol stack depending on the communication capabilities and configurations of the current network.

Figure 7B:
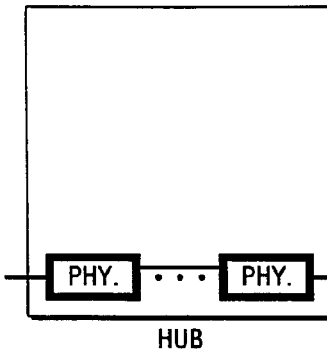

Hubs, as shown in FIG. 7B, provide a well defined interface to connect host computers and network devices by transmitting packets across multiple physical connections. Hubs do not provide any manipulation or translation of the content of the packets being transmitted.

Figure 7C:
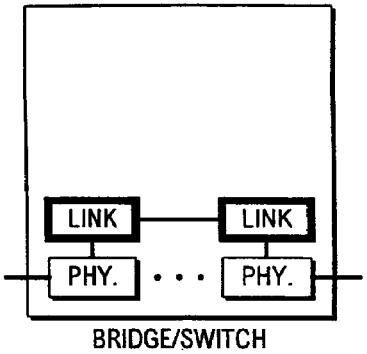

Bridges or switches, as shown in FIG. 7C, provide an intelligent filtering mechanism by which packets are transmitted across multiple physical connections based upon the physical connection the device is connected to, according to the link layer addressing (Media Access Control Address). Bridges and switches do not manipulate the content of the packet and do not provide any higher layer protocol functionality.

Figure 7D:
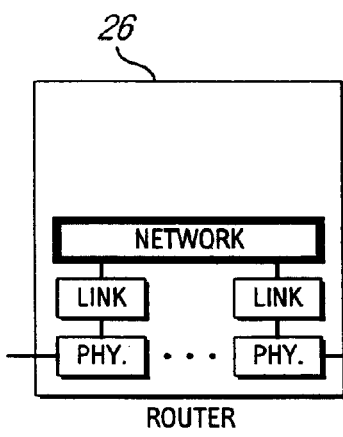

Routers, as shown in FIG. 7D, accept packets based upon the destination address at the network layer in the packet. However, the host computer must explicitly address the packet to the router at the link layer. The router will then retransmit the packet across the correct physical connection based upon how it is configured. No modification or translation of the packet is performed at any higher layer of the protocol stack than the network layer.

Figure 7E:
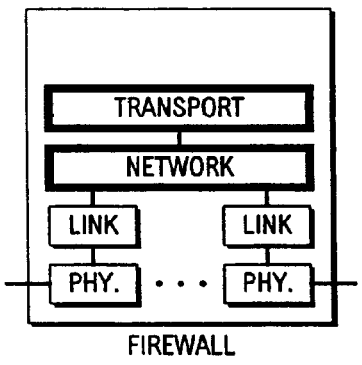

Firewalls, as shown in FIG. 7E, filter packets at the network and transport layers to allow only certain packets to be retransmitted on the other physical connection. Firewalls do not manipulate the content of the packet, only forward it on to the next hop in the network if it passes the transport (port) or network (IP address) filter.

Figure 7F:
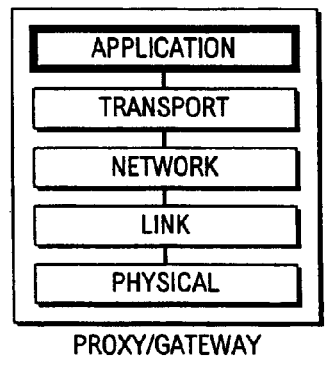
Figure 7G:
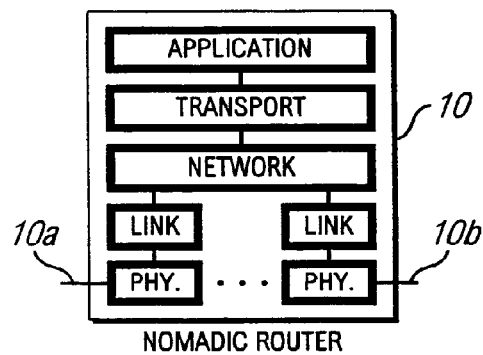

Proxies and gateways, as shown in FIG. 7F, only receive packets explicitly addressed to them by host computers. They only manipulate packets at the application level. The present nomadic router 10, as shown in FIG. 7G, manipulates and content of the packets at the link, network, transport, and application layers of the protocol stack to provide a translation between the host computer configuration and the configuration of the remote or foreign network to which the host computer is currently attached.

Unlike all other devices shown in FIGS. 7A to 7F, router 10 automatically intercepts and translates packets without the other devices being aware of router 10 or being configured to use it, i.e., without packets being addressed to router 10. The translation algorithms in router 10 which provide this location independence are provided completely internal to router 10. Thus, no new standards need to be developed, accepted, or implemented in host computers 12 or routers 26 to deploy new network services when using the nomadic router.

Whenever a new or different communication device (which includes the link and physical layers) is utilized in a host computer 12, the host computer's network layer must be aware of this new communication device. Since router 10 has its own network interface to the communication device, alternate communication devices can be utilized in router 10 which the host computer 12 can utilize but does not have to be configured to use.

Permanent Addressing not Location Based

Today we communicate with individuals in terms of the location of their communications instruments (for instance, their computer's IP address or their fax machine's phone number). To support mobility and changing communication environments and devices, it is necessary to create an environment where people communicate with other people, and not specifically with the devices they use. To transparently support mobility and adaptivity in a wireless, potentially ad-hoc, communication internetwork, a common virtual network must be provided by an intelligent device or agent which supports the various computing hosts and communication devices.

Nomadic router 10 provides the mapping between the location based IP address used in the internet today and the permanent user based address housed in the host CPU in device 12. This is illustrated in FIG. 2 as "IP Mapping." This mapping is done without support or knowledge of such mapping by the host CPU or user.

Figure 3:
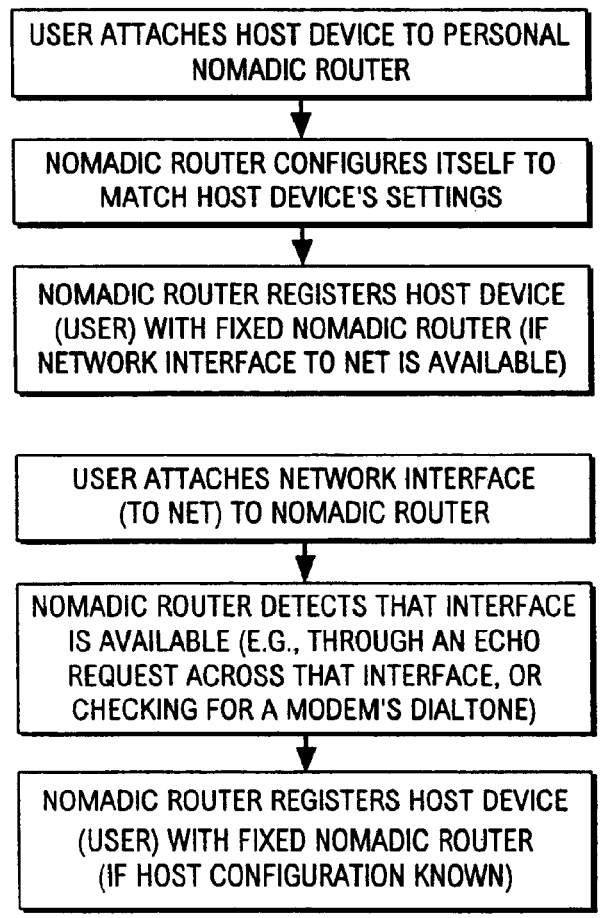
FIG. 3 is a flowchart illustrating a configuration overview of the basic steps performed when a host device is attached to the present nomadic router and when a network interface is attached to the router.
Figure 4:
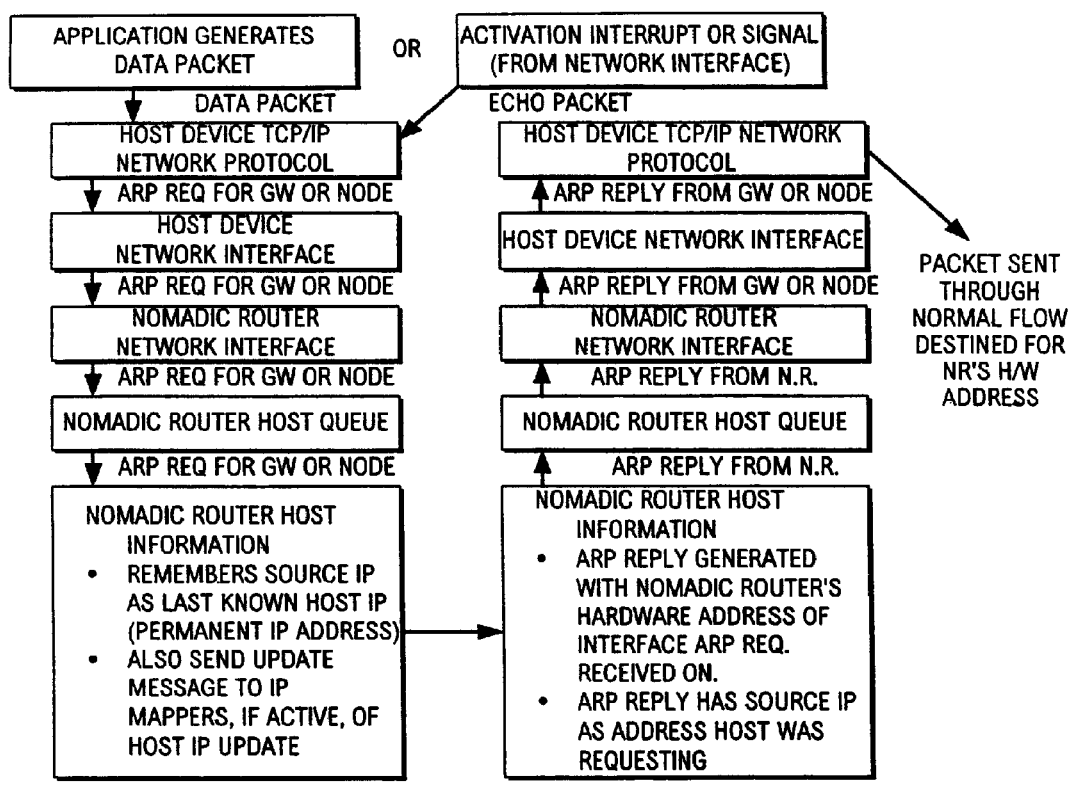
FIG. 4 is a flowchart illustrating automatic adaptation to the host device when the first data packet from the host is sent to a home network router or when an activation interrupt or signal is received.

The internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router. The host configuration information, such as IP number, is discovered or determined as illustrated in FIG. 4 and stored in nomadic router 10 as illustrated in FIG. 2 as "Host Info." This configuration process is overviewed in FIG. 3.

Optional Off-Loaded Processing

Figure 2:
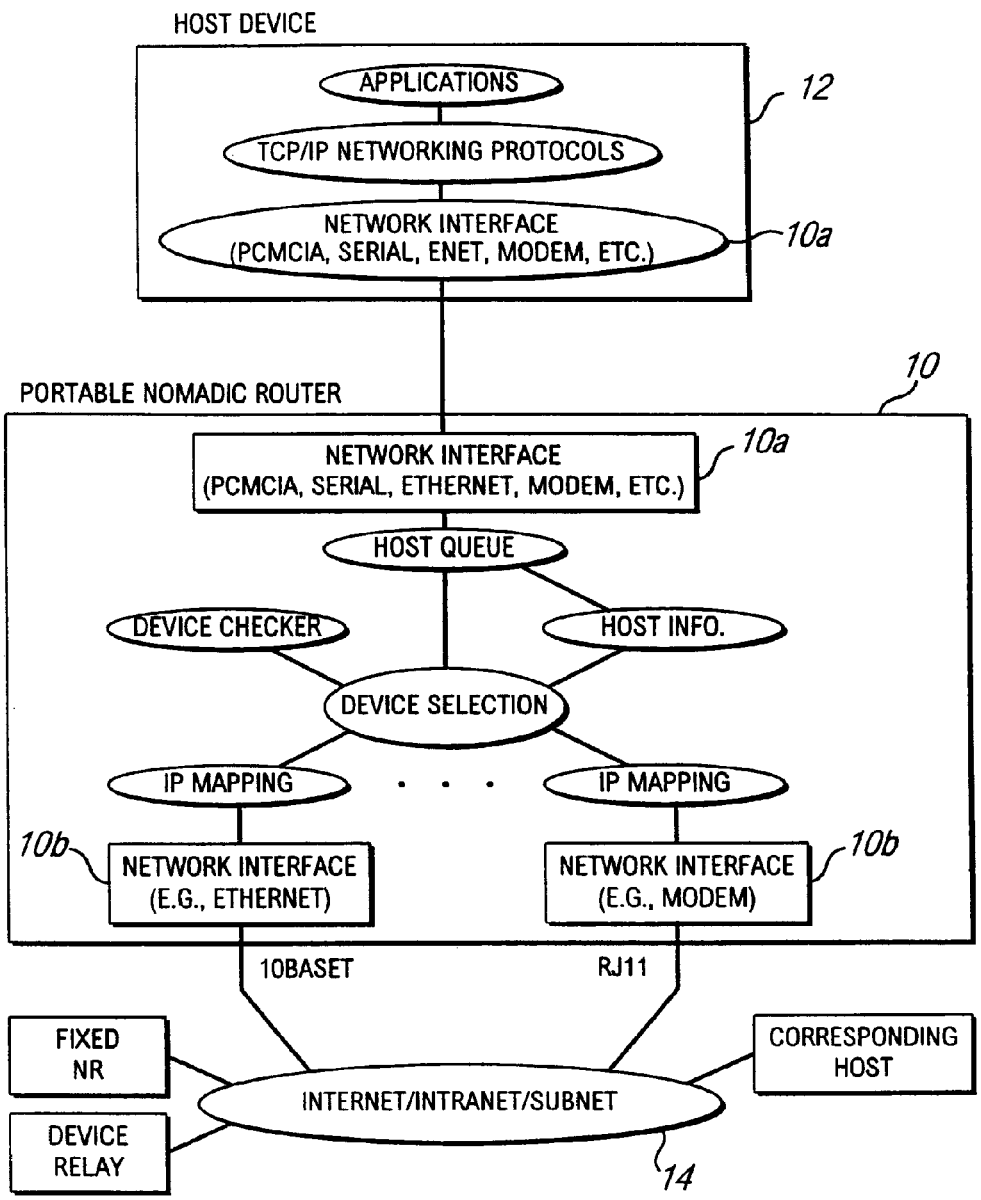
FIG. 2 is a diagram illustrating a basic nomadic router architecture, which is referred to as the hardware implementation architecture.

As illustrated in FIG. 2, nomadic router 10 can provide off-load communication processing for the host CPU by being physically separate from host device 12. The adaptation, selection, and transportation of information across the network is performed by nomadic router 10. This allows the host terminal or device 12 to utilize the network without having to directly support the network protocols. By having the nomadic router be responsible for adapting to the current network substrate, the host CPU can maintain a higher performance because the routing, adaptation, packetization, etc. algorithms, or packet processing, are performed by router 10.

The nomadic router can also queue, transmit, and receive data independent of whether the host device 12 is available or even attached. CPU 1 built into nomadic router 10 may provide all necessary computing routines to be a fully functional network co-processor independent of the host CPU. This will allow increased battery life for the user because the nomadic router does not have numerous user I/O devices as does the host device 12.

Location Independence

The instant network nomadic router provides the ability to provide ubiquitous and reliable support in a location independent fashion. This removes any burden on the user for device reconfiguration (e.g., IP address configuration, gateway or next hop router address, netmask, link level parameters, and security permissions) or data transmission.

The problem with existing protocol stacks is that communicating devices have to be reconfigured every time the communication environment changes. TCP/IP requires a new network node and gateway number. Appletalk will automatically choose an unused node number and discover the network number, but all open communications are lost and services have to be restarted to begin using the new information.

This occurs, for example, when a PowerBook is plugged into a network, put to sleep, and then powered up in a different network. All network services are restarted upon wakeup, and network applications get confused if they are not restarted. The nomadic router solves this problem by providing temporary as well as permanent network and node numbers similar to that provided by Mobile IP. However, the nomadic router will also work with other protocol stacks (e.g., AppleTalk).

Figure 5:
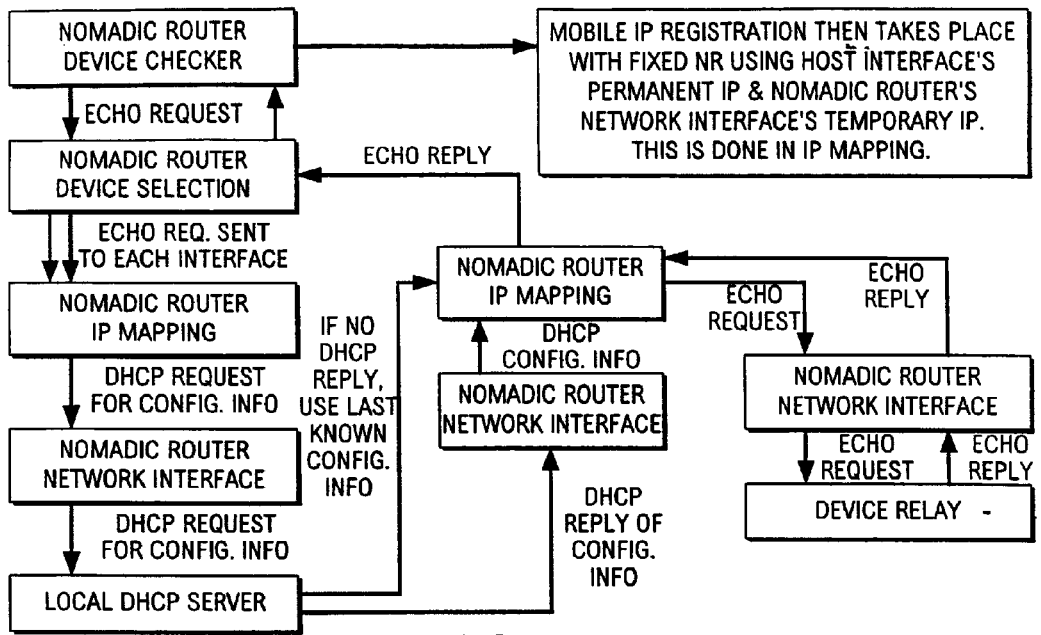
FIG. 5 is a flowchart illustrating a process initializing and checking the various communication device interfaces for initialization, activation, etc.

Mobile IP provides location independence at the network level and not at the link level. All link level parameters, which are device specific, will be automatically configured as illustrated in FIG. 5 when a new communications (network interface) device is attached to the nomadic router. The nomadic router completely eliminates the need for manual configuration by adaptively supporting device independence.

Multiple Substrates (Device Independence)

Another innovative feature of the nomadic router is the support for simultaneous use of multiple communication substrates. This is illustrated in FIG. 2 as "Device Selection." Users should be able to utilize two or more communication substrates, either to increase throughput or to provide soft-handoff capability. This functionality is not supported in today's typical protocol stacks (e.g., TCP/IP or AppleTalk).

For example, via the "network" control panel, the user can select between communications substrates such as EtherTalk, LocalTalk, Wireless, ARA, etc., but cannot remotely login across EtherTalk while trying to print via LocalTalk. Routers are typically able to bridge together various communication substrates, but merging the LocalTalk and EtherTalk networks together is often not desirable for many reasons, including performance and security.

A problem with existing routers is that they require manual configuration and exist external to the node. To overcome this, the nomadic router can support automatic configuration and full router functionality internally. This allows a mobile or nomadic node to adapt to various communication and network devices dynamically, such as when the user plugs in a PCMCIA card or attaches a communications device to the serial port.

Once the nomadic router becomes aware of the available communication devices and activates them, the transport of data across the multiple communication substrates can take place. The unique algorithm and protocol in the nomadic router which chooses the most appropriate device to use, is shown in FIG. 2 and FIG. 5 as part of the "nomadic router Device Checker" through the "nomadic router Device Selection" across each interface.

There are numerous factors that can affect the selection of utilizing one or more devices. Such factors typically include available bandwidth, cost to initiate and maintain connection, power requirements and availability, and user's preference.

Another feature of the nomadic router is the support for alternate or simultaneous use of various communication substrates. This is performed as part of step 5 in FIG. 6 when the source address is that of the communication substrate on which the nomadic router is going to send the packet. Host computers will now indirectly be able to utilize two or more communication substrates, either to increase throughput or to provide soft-handoff capability.

This functionality is not supported in typical protocol stacks (e.g. TCP/IP or AppleTalk). Once the nomadic router becomes aware of the available communication devices and activates them, the transport of data across the multiple communication substrates can take place. The unique algorithm and protocol in the nomadic router which chooses the most appropriate device to use is part of the "nomadic router Device Checker" through the "nomadic router Device Selection" across each interface.

There are numerous factors that can affect the selection of utilizing one or more devices. Such factors typically include available bandwidth, cost to initiate and maintain connection, power requirements and availability, and user's preference.

Hardware Specification

Figure 6:
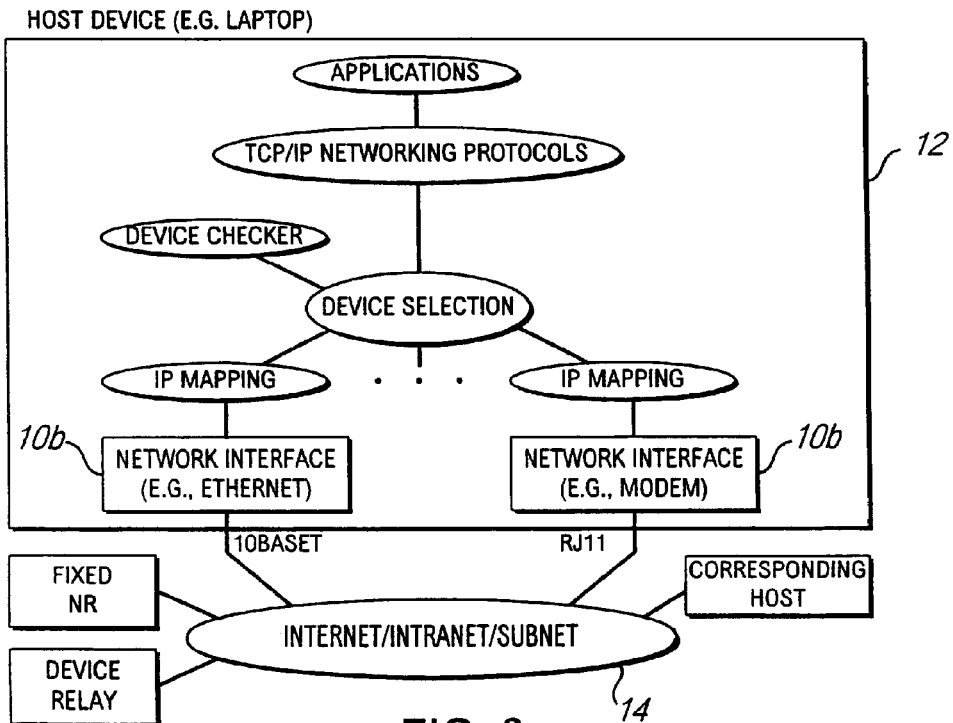
FIG. 6 is a diagram illustrating a basic nomadic router architecture when implemented as software in the host device.

The nomadic router can run completely in software without any special hardware as shown in FIG. 6, or without a CPU separate from the main host, or packaged in the form of a hardware device as shown in FIG. 2. The nomadic router can also be provided as a digital storage medium which stores the software program that implements the functionality of the router's translation processing. Examples of digital storage media include optical media (e.g. CD-ROM), magnetic media (e.g. floppy disks), non-volatile or read-only memories, or any combination thereof. The program is loaded into and run on mobile terminal 12, or alternatively into any other computer or router which is connected to a network.

One potential implementation of the nomadic router device uses Embedded PC Technology. As an example, the rugged PC/104 standard modules have a form-factor of 3.550" by 3.775" and typically 0.6" per module and weigh approximately 7 oz. per module. The PC/104 module's utilization of a self-stacking bus with minimum component count and power consumption (typically 1-2 Watts per module) eliminates the need for a backplane or card cage.

The nomadic router can run on a 16 bit bus with an 80486 processor, for example. The standard network access devices can support burst rates up to 10 Mbps with typical user data throughput around 1-2 Mbps. The user bandwidth is less depending on the available wireless communication device. For example, Proxim's 2 Mbps wireless LAN typically covers 500 yards with user data throughput around 500 Kbps. As illustrated in FIG. 1, nomadic router 10 typically includes three modules; a processor 10, host device or terminal interface 10a, and communication device or system interface 10b.

Another potential hardware implementation is with the CARDIO S-MOS System technology. This CPU board is basically the same size as a PCMCIA credit card adapter. It is 3.55×3.775×0.6 inches. The power requirements are +5V DC ±10% with an operating temperature of 0 to 70° C., a storage temperature of −40 to 85° C., and relative humidity of 10% to 85% non-condensing.

The CARDIO is the most compact PC/104 compatible system available which meets the one-stack mechanical and electrical PC/104 Rev. 2.2 specifications. Power fail indicator, battery backup, and automatic switchover are also possible.

The nomadic router can also be implemented on a small portable device such as a PCMCIA card or partially on a PCMCIA card. In the case of a full implementation on a PCMCIA card, the host CPU and power supply are used to execute the Nomadic Routing and other protocols, algorithms, operating system, and application services. A hybrid implementation with some components as part of a PCMCIA card and others as part of other hardware implementation can also be used.

Apparatus Components

By performing packet translation in a self-contained apparatus, processing done on the packets in the nomadic router does not affect the host computer. All specific translation of the packets to match the network's configuration and available services is done internally to the nomadic router. The nomadic router can queue, transmit, and receive data independent of whether the host computer is available or even attached. The algorithms and microcontroller built into the nomadic router provides all necessary computing routines to be a fully functional network co-processor independent of the host computer.

By allowing the nomadic router to process packets independently of the host computer, the host computer can be powered down or asleep while processing is taking place, providing an increase in battery life for the mobile host computer.

Figure 10:
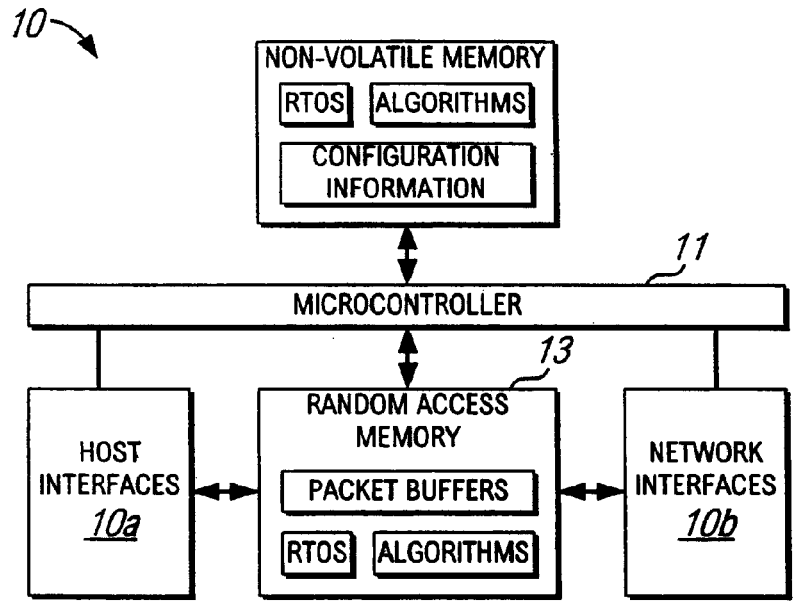
FIG. 10 is a diagram illustrating the architecture of the nomadic router implemented as a hardware device including a microcontroller and a non-volatile memory for storing algorithms implementing the translation function.

The nomadic router can be configured with various components in several different ways. In FIG. 10, the nomadic router contains a processor or microcontroller 11 to translate the packets stored in packet buffers in random access memory. The translation functions are stored in non-volatile memory 13 with the Real Time Operating System (RTOS) and configuration information relative to the types of translation that need to be performed.

Upon startup (boot) of the nomadic router, the RTOS and translation algorithms are loaded from non-volatile memory into RAM where they are executed. There may be zero, one, or more host interfaces in which host computers are connected. There are one or more network interfaces. If no host interface is available, the nomadic router receives packets via the host computer from the network interface.

Figure 11:
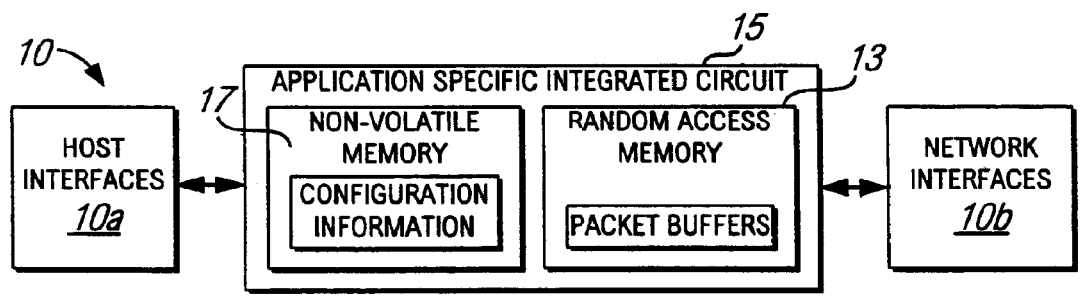
FIG. 11 is a diagram illustrating the architecture of the nomadic router apparatus implemented as an Application Specific Integrated Circuit (ASIC) chip.

In FIG. 11, nomadic router 10 is implemented as an Application Specific Integrated Circuit (ASIC) or Field Programmable Gate Array (FPGA) 15. These chips embed the algorithms for packet translation. The chip can include storage for non-volatile memory 17 which stores the configuration information such as when manually configured for the current network. The chip 15 can also include random access memory to buffer packets for translation in the nomadic router before being sent off to the host or network interface.

Apparatus Packaging

As described above, the nomadic router can be packaged in several different hardware configurations. The nomadic router can be embedded in the host computer, or a network device, such as a switch or router. It can also be implemented as a PCMCIA card which plugs into the host computer, or as a self-contained external box.

Figure 12A:
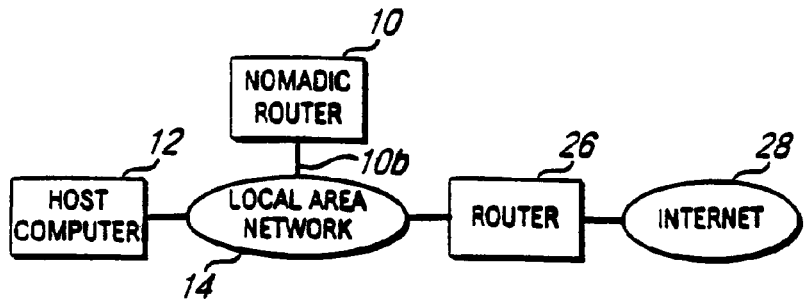
FIGS. 12A to 12E are diagrams illustrating host and network interface modes in which the nomadic router is able to operate.

Each nomadic router can have from one to many interfaces. If router 10 is put into the network infrastructure, it does not have to be carried around with the mobile user. As shown in FIG. 12a, nomadic router 10 is attached to a Local Area Network (LAN) of the network infrastructure (which constitutes the communications device 14) through system interface 10b. LAN 14 is connected through a conventional router 26 to the internet 28. In this case, host computer interface 10a of nomadic router 10 is not needed since packets from host computer 12 are received through LAN 14.

Figure 12B:

To provide a secure interface between host computer 12 and network 14 to prevent host computers from being able to watch (sniff) packets on network 14, nomadic router 10 can have one interface to host computer 12 (terminal interface 10a) and a second interface (10b) to network 14 as shown in FIG. 12B. Nomadic router 10 can provide filtering of packets received and retransmitted between the various interfaces thus providing a firewall type of security device which operates internally on the network.

Figure 12C:
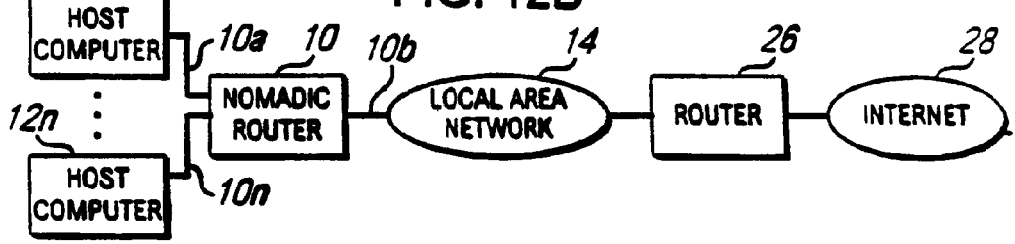
Figure 13:
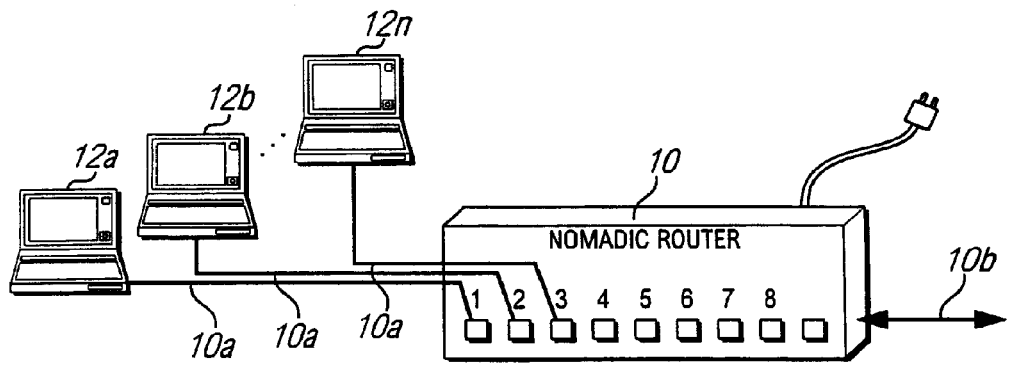
FIG. 13 is a simplified perspective view illustrating the nomadic router as implemented in a self-contained box which connects onto a local area network via a network interface port and has multiple ports to connect to host computers.

To support multiple host computers 12a . . . 12n with a single nomadic router 10, nomadic router 10 may have multiple host interfaces $10a_1 \ldots 10a_n$ as shown in FIG. 12C and in FIG. 13, and a network or system interface 10b.

Figure 12D:
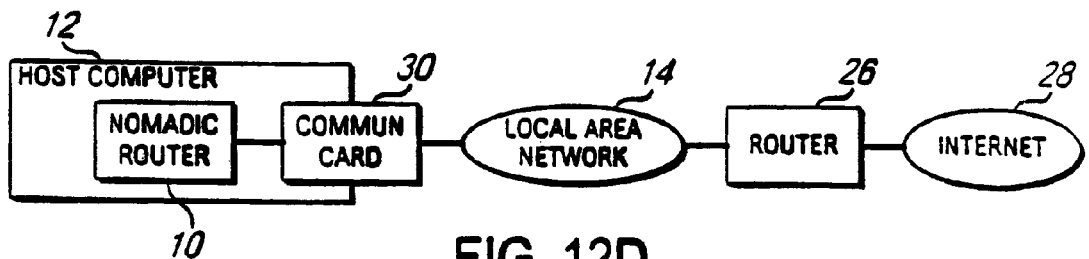

If the nomadic router is carried around by the mobile user, it can take the form of a PCMCIA card. In FIG. 12D, nomadic router 10 is implemented as a PCMCIA card. The processing and translation capability is stored inside the card and the interface to host computer 12 is through a PCMCIA BUS interface or communication card 30.

Figure 12E:
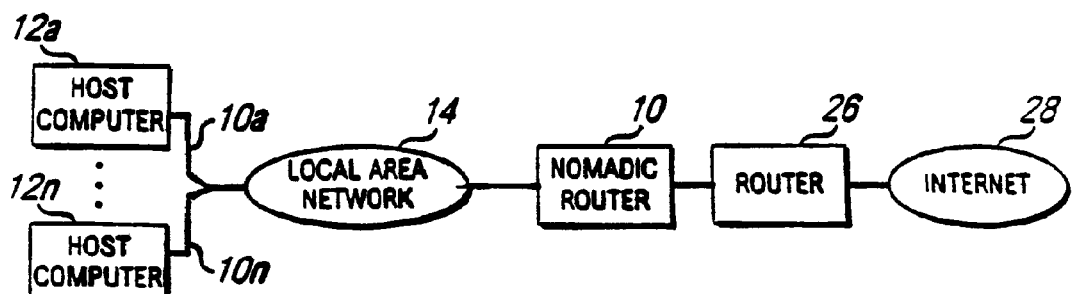

The nomadic router may also be used as an interface between a local area network 14 and a router 26 as illustrated in FIG. 12E. Local area network 14 may be a mobile or portable network with router 26 being fixed at a particular location with a physical connection to the internet. Such an arrangement may be used for a customer demonstration or trade show, for example, where the local area network 14 is established among computers previously configured to communicate with each other but not with the foreign network having router 26.

Figure 14:
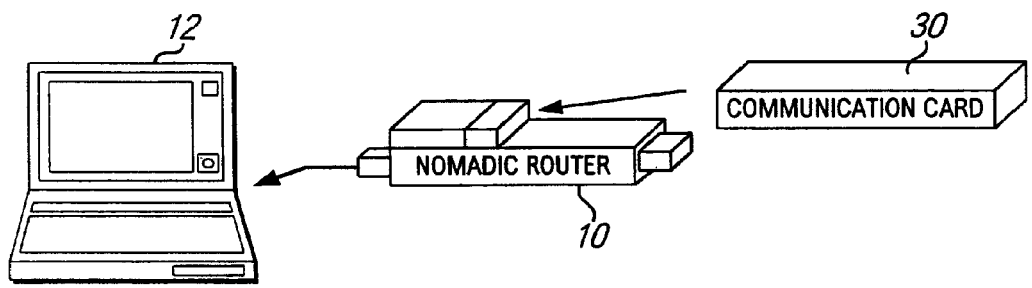
FIG. 14 is a simplified perspective view illustrating the nomadic router apparatus as implemented on a PCMCIA Type II card where the nomadic router plugs into the host computer's type II slot and the communication card device, of Type II, plugs directly into the nomadic router so both may be powered and stored in the portable host computer.

As shown in FIG. 14, the PCMCIA card can fit in a type III slot where there is a connector on nomadic router 10 which accepts communication card 30 (a type II PCMCIA card). In this mode, the nomadic router does not require internal communication device specific components.

Figure 15:
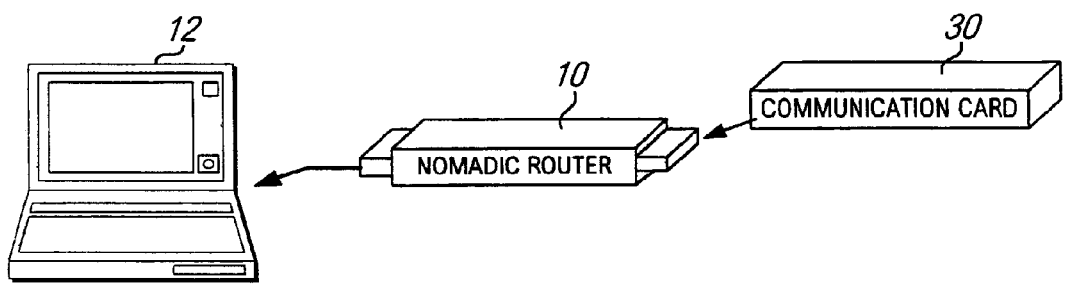
FIG. 15 is a simplified perspective view illustrating the nomadic router as implemented on a PCMCIA Type II cared where the nomadic router plugs into the host computer via a type II interface slot and where the communication card device, Type II, plugs into the nomadic router type II card.

Nomadic router 10 can also take the form of a type II PCMCIA card. In this form, the communication device or card 30 plugs into the opposite end of nomadic router card 10 as illustrated in FIG. 15.

Translation Operation of the Nomadic Router

Initialization and Self Configuration

The nomadic router initialization and self configuration process provides the means by which the nomadic router is able to learn about the host computer and network so it knows what translation is necessary.

Host Learning

Depending on the particular application, the nomadic router may have to learn the configuration of the host computer, the remote/foreign network, or both. For example, when utilized as a fixed nomadic router in a hotel or multiple dwelling unit, the nomadic router will have already learned (or been manually configured for) the remote/foreign network. The nomadic router need only determine the settings of mobile hosts which are subsequently connected to the network. Similarly, when the nomadic router is implemented as a PCMCIA card which travels with the mobile host, the nomadic router need only learn the settings of the foreign/remote network (since the host settings were previously learned or manually configured). In some applications, the nomadic router learns both the network and host configurations as previously described.

Nomadic router 10 is able to learn the host computer 12 configuration by looking at the content of the packets sent from host computer 12. Rather than host computer 12 sending packets directly to router 26 or other network device (which is what it is initially configured to do), nomadic router 10 is able to redirect all outbound packets from the host computer 12 to itself. This redirection can be accomplished in several ways as described below.

1. Proxy ARP Packet Interception and Host Reconfiguration

Figure 8:
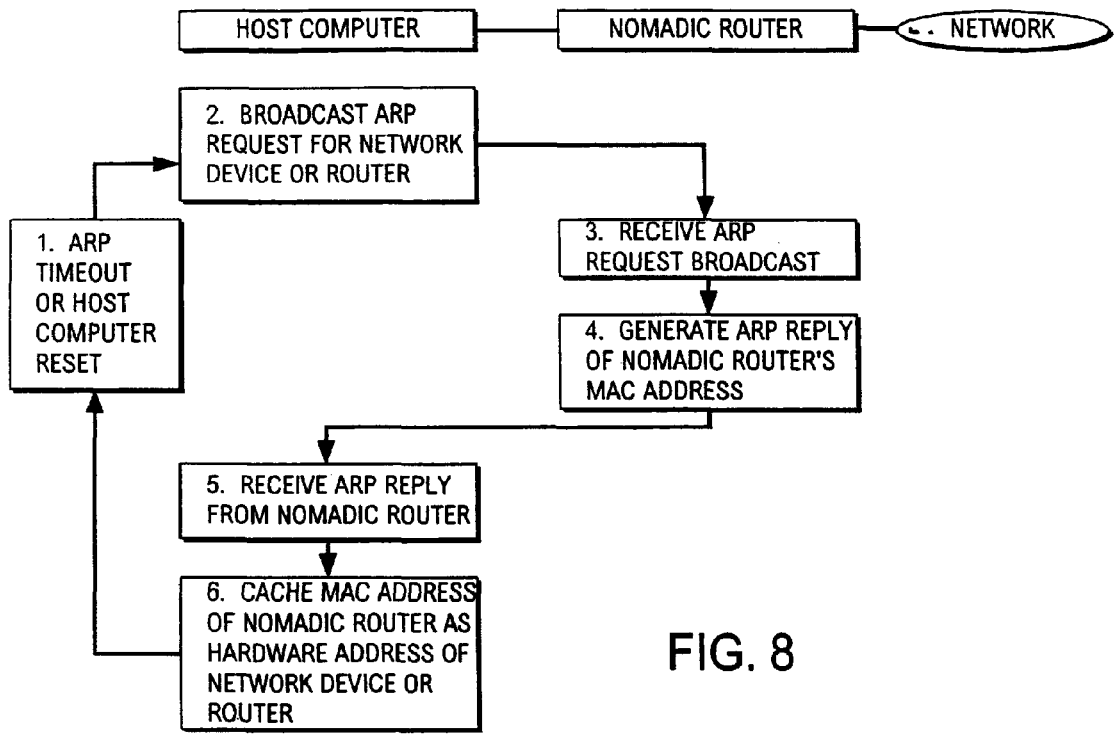
FIG. 8 is a flowchart illustrating a proxy ARP packet interception and host reconfiguration process.

Whenever a host computer 12 has an IP packet to send to router 26 or other network device, host computer 12 uses the Address Resolution Protocol (ARP) to obtain the link layer Media Access Control address (MAC address). As illustrated in FIG. 8, when host computer 12 broadcasts an ARP request for the MAC address of a destination node, nomadic router 10 intercepts this ARP request broadcast and responds with its own MAC address (rather than that of the destination node).

When host computer 12 receives the ARP reply from nomadic router 10 (which contains the MAC address of nomadic router 10), host computer 12 caches this MAC address and sends all packets destined for the configured router or network device to the MAC address of nomadic router 10. Host computer 12 will think that the MAC address is that of its originally configured IP network device. However, nomadic router 10 is only pretending (proxying) to be the device (its home gateway) that host computer 12 expects to find.

Nomadic router 10 is also able to reconfigure and intercept return packets from a router or other network device using the same process.

2. Promiscuous Mode Packet Interception

Since the MAC address is cached in host computer 12 for a short period of time, host computer 12 will not send out a new ARP request to obtain the MAC address again unless a timeout period occurs or the cache is cleared, such as when computer 12 is restarted.

When a conventional network device receives or hears a packet with a MAC address which does not match its own, it will ignore or drop the packet. Since it is possible to rapidly switch from one network environment to another using a portable computer, nomadic router 10 must be able to intercept packets even when the MAC address is not that of the nomadic router's home gateway or device.

This is accomplished by placing the nomadic router's network connection in promiscuous mode. In this mode, the network connection on the nomadic router accepts all packets being transmitted on the communication link, not just ones being broadcast or addressed specifically to it.

3. Dynamic Host Configuration Protocol (DHCP) Service

Nomadic router 10 may also provide other network services to host computer 12. For example, host computer 12 may be able to utilize the DHCP service to obtain configuration information rather than being manually configured. However, a host computer utilizing the DHCP service requires that a DHCP server be installed on the network segment to which it is currently attached. If host computer 12 is configured to use this service but a DHCP server is not available on the remote/foreign network, nomadic router 10 will intercept the DHCP requests and respond with configuration information for host computer 12 to use.

Network Learning

The nomadic router is able to learn about the network environment it is currently attached using several different methods as described below.

1. Dynamic Host Configuration Protocol (DHCP)

When the nomadic router is connected to a different network, it will broadcast a DHCP request to obtain configuration information for that network. If no DHCP service is available on the network, the nomadic router will use another method to learn about the network configuration.

2. Router Information Packets

For example, routers on the network will periodically broadcast router information packets which are used to build routing tables and allow routers to adapt to changes in the network. Nomadic router 10 will listen on the network for these router information packets. When a router information packet is received, the nomadic router will extract the configuration information from each packet and store the information for use in translating packets from the mobile host.

3. Passive Learning

By placing the nomadic router's network connection in promiscuous mode, the nomadic router receives all packets (not just ones addressed to the nomadic router). The nomadic router examines all packets received on the network interface to discover the network configuration. The nomadic router is also able to determine the IP addresses used on the current network and which machines are routers (by the final destination address not being the next hop address).

Using this method, nomadic router 10 is passively able to learn how the network is configured and will elect to use an unused IP address. If that IP address does become used by another network device, the nomadic router will switch over to another unused IP address.

4. Manual Configuration

The network configuration information can also be manually configured in nomadic router 10 as described above. This information can be set using an embedded web server, Simple Network Management Protocol (SNMP) tools, an application running on one of the computers in the network, or other suitable means. When manual configuration is used to set the network configuration, nomadic router 10 will still automatically learn the host information and provide all the translation capabilities so the host computers do not have to be aware of the correct network information of the LAN to which they are currently connected.

Packet Translation

After learning the network and/or host computer configuration(s), the nomadic router has the necessary information to translate packets transmitted/received by the host computer. The nomadic router's packet translation function provides a mapping between location and service dependent configurations used by host computer 12 and that used by network 14 to which it is currently attached. For outbound traffic from host computer 12 to network 14, the translation function changes the content of the packet such as the source address, checksum, and application specific parameters, causing all packets sent out to network 14 to be directed back to nomadic router 10 rather than to host computer 12.

Inbound traffic from network 14 arriving at nomadic router 10 (which is really for host computer 12), is passed through the translation function so host computer 12 thinks that the replies were sent directly to it. Host computer 12 will be completely unaware of all the translation being performed by nomadic router 10.

Figure 9B:
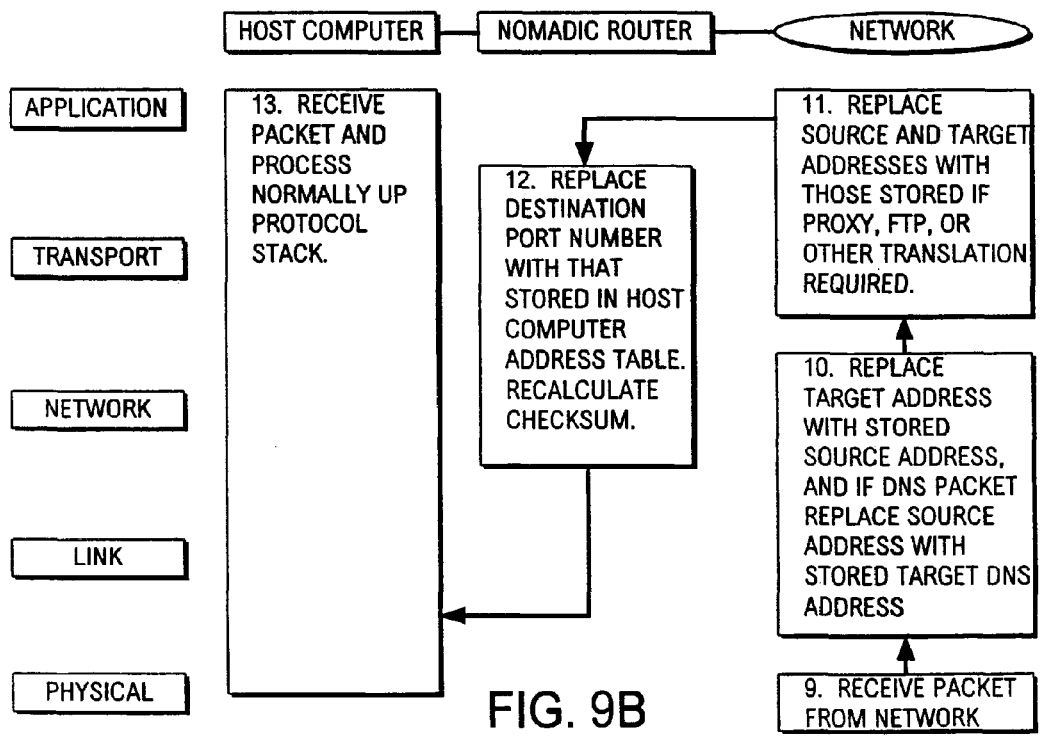
FIGS. 9A and 9B provide a flowchart illustrating a translation process which takes place in the host computer and nomadic router at various levels in the protocol stack.
Figure 9A:
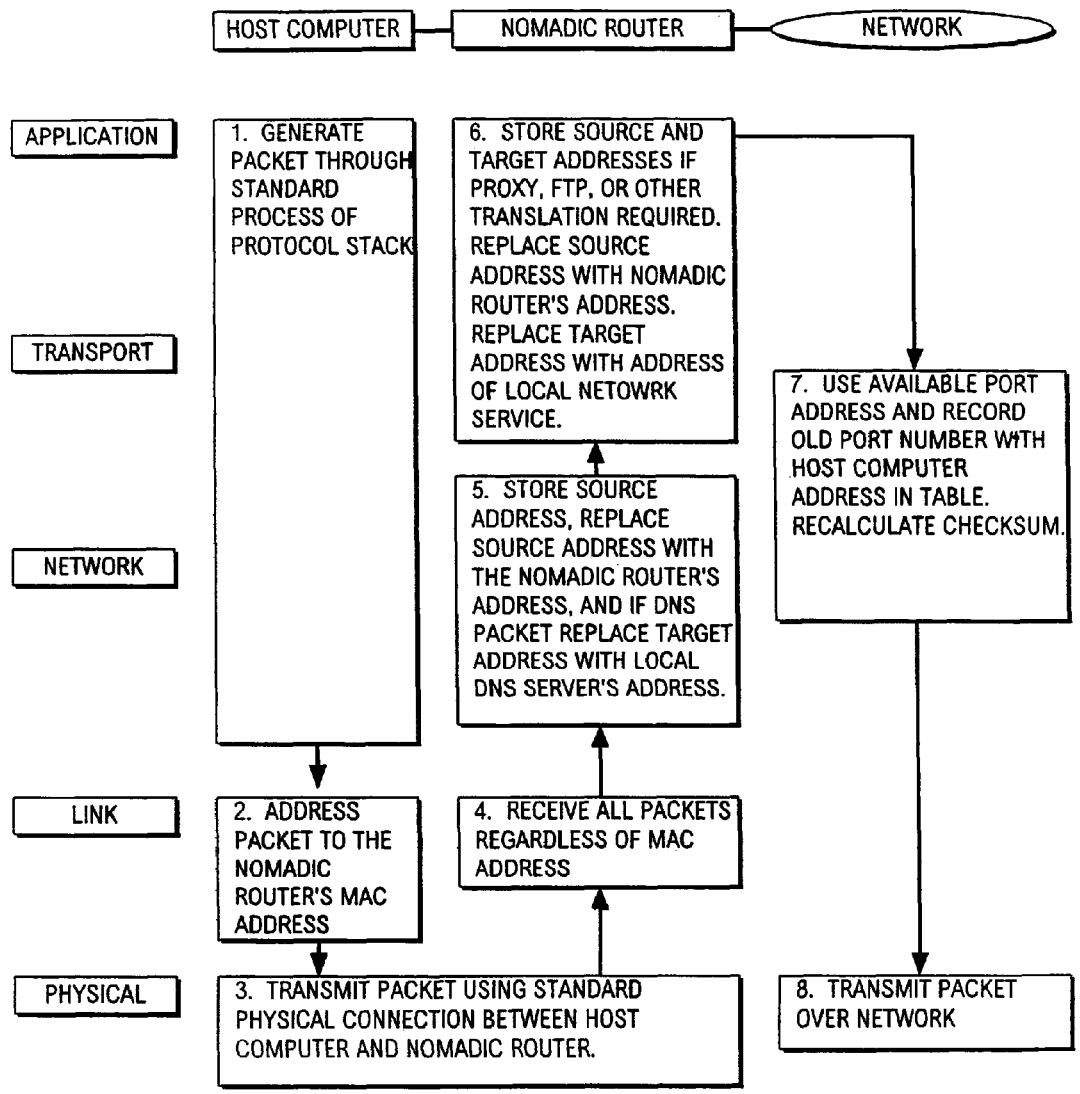

The translation functions works as illustrated in FIGS. 9a and 9b. In these figures, the operations performed in the OSI/ISO model application, transport, network, link, and physical layers are illustrated in rows opposite the layer designations. The operations performed by host computer 12, nomadic router 10 and network 14 are illustrated in columns below the device designations.

Host computer 12 will generate network packets using the current configuration stored in host computer 12 using the standard protocol stack as shown in step 1. This configuration information is either manually configured in host computer 12 or obtained using DHCP (from the network or the nomadic router).

As shown in step 2, when host computer 12 attaches the link level destination address (automatically obtained using the Proxy ARP packet interception routine described earlier), host computer 12 will send the packet to the network address of its standard router or home gateway device using the link level address of the nomadic router 10.

In step 3, the packet is transmitted across the standard physical connection between host computer 12 and nomadic router 10. As shown in step 4, nomadic router 10 will receive the packet at the link level either because the Proxy ARP function reconfigured the host computer's MAC address, or because nomadic router 10 has the network link level in promiscuous mode which causes it to receive the packet even if addressed to a different MAC address.

Once the packet is passed to the network layer, shown in step 5, the nomadic router translation function will modify the content of the packet to change the source address to match that of the nomadic router's address instead of the host computer's address. It will also translate other location dependent information such as the name of the local Domain Name Service (DNS) server. When translating the DNS packet, it will change the source address to that of the nomadic router's address and the destination address to that of a local DNS server.

Once the network layer translation is complete, the packet can be translated at the application and transport layers. The application layer is translated next, as shown in step 6, because the transport layer required a pseudo-network layer header which includes the course and destination addresses and the content from the application layer.

At the application layer translation, any addresses which describe the source address of the host computer, such as with FTP, are translated to be that of the nomadic router's address. Any application layer destination addresses, such as a local proxy server, are translated to match that of the server running on the current network.

Once this application layer translation is complete, the transport layer, as shown in step 7, can complete the checksum and any port number manipulation. The port number is manipulated if more than one host computer 12 is attached to nomadic router 10. Each request sent by any one of the host computers 12 include a specific port that is translated to match an available inbound port on the nomadic router 10.

The port number assigned for use with each host computer 12 is stored in a table in nomadic router 10 and is utilized with the reply packet to route the reply to the corresponding host computer as describer later. Finally, the outgoing packet is transmitted over network 14 in step 8.

When a reply packet is transmitted over network 14, as shown in step 9, nomadic router 10 will receive the packet. In step 10, nomadic router 10 will perform the reverse network layer translation to set the destination address to that of host computer 12 rather than the nomadic router's address, and any source address to the source address replaced by nomadic router 10 in step 5.

Once network translation is complete, the packet is translated at the application layer, as shown in step 1, to change the destination address to that of host computer 12 and the source address to the original destination address stored from step 6. In step 12, any port manipulation performed in step 7 is changed to the original setting and a new checksum is computed. Finally, as shown in step 13, the packet is sent to host computer 12 which then processes the packet normally.

Options of the Nomadic Router

There are numerous options and applications of the nomadic router. These applications include, but are not limited to, Nomadic E-mail, Remote Network File Synchronization, Nomadic Database Synchronization, Instant Network Nomadic Routing, Nomadic Intranets, and Trade Show Data Exchange. Each of these are described in more detail below.

Nomadic E-Mail

The Nomadic E-mail application provides a synchronized yet distributed means for updates, reconciliation, and replicas to propagate through the internet. Nomadic routers are located on various networks of the internet and are equipped with nomadic E-mail support to provide synchronization, etc. Each nomadic router enabled for nomadic E-mail can utilize protocols such as IMAP to provide support for mobile users without the host device having to support it (similar to the POP3 protocol standard in internet E-mail clients).

Remote Network File Synchronizer

The Remote Network File Synchronization option of the nomadic router provides copies of user files that are stored/cached at various locations (e.g., hotel, office, home) on other nomadic routers equipped for remote network file synchronization. Copies of updated files are automatically synchronized and distributed among all peer locations. Local updates can be made while the host is disconnected from the nomadic router and from the network.

Nomadic Database Synchronizer

The Nomadic Database Synchronizer houses the user's (synchronized) master databases (e.g., contacts, addresses, phone numbers). The nomadic router of the database synchronizer does not need to be used on the network because it will interface directly with various host devices such as laptops, desktops, personal digital assistants, handheld personal computers, pagers, etc. via various standard ports.

Instant Network Nomadic Router

The objective of the instant network nomadic router is to enable rapid deployment of a communication network in any environment with little or no fixed infrastructure. The host and communication devices do not have to directly support the rapid deployment functionality.

The instant network nomadic router distributedly and intelligently establishes a wireless (or wired) communication link between the host device and the desired communication system while performing configuration, security, multihop routing, and network level data transmission over various communication devices. The nomadic router performs all the necessary network creating and processing automatically to remove configuration and system support from the host system or user. The instant network nomadic router utilizes proprietary and existing/emerging wireless communication systems, and multihop routing protocols.

Many communication infrastructures are varied and fragmented, which is likely to be exacerbated as more technologies are introduced. For example, high performance LANs, wireless services, cellular telephony, satellite, and ubiquitous paging networks, all provide varying degrees of coverage, cost, and bandwidth/delay characteristics.

Conditions may range from no connectivity at all because of lack of service, to partial and/or intermittent connectivity as devices are plugged and unplugged from a system. Likewise, damage to communications infrastructures (deliberately or by accident), lossy communication as a system moves through various service areas or difficult domains, and times when multiple network devices (communication substrates) can be used at the same time complicate connectivity. The instant network nomadic router will dynamically adapt the communication internetwork (dynamically creating one if necessary) to provide survivable communication in a mobile chaotic environment without the need for centralized control or fixed infrastructures.

The rapidly deployable nomadic router is a device associated with each user host device (e.g., PDA or laptop computer). It transparently provides the following capabilities for host computer systems using various wireless communication devices for physical and link layer access: dynamic wireless network creation; initialization into existing wireless networks; automatic configuration; network and subnetwork level data transmission; and multihop routing functionality.

The nomadic router can detect another device by polling the interface, providing an interrupt signal, or through specialized signaling. This in turn activates the nomadic router to provide translation for the device (if necessary) and establish a communication link to an appropriate corresponding interface and wireless subnetwork. The nomadic router operates at a level between the host device generating data and the physical communication transmission device as illustrated in FIG. 1.

Nomadic Intranet

The Nomadic Intranet application provides all network and server type services for users to dynamically create an adhoc network. This is similar to the instant network nomadic router except the nomadic intranet is a single device with multiple ports into which laptop/devices can be plugged. The instant network nomadic router is distributed to each host device. The nomadic intranet not only provides adhoc networking but can also provide services such as temporary file storage, protocol conversion, act as a print server, and provide other services described as part of the Basic nomadic router.

Trade Show Nomadic Router

The Trade Show nomadic router applications not only provide the basic nomadic router functionality for an exhibitor's computer that is brought to the show, but also provides lead capture and/or information distribution. Lead capture can be provided by interfacing with a badge reader to read attendees' information. This information is then captured by the nomadic router and made available in the exhibitor's lead database.

The nomadic router can also provide a mechanism for distributing information to the attendees' personalized web pages or sent via e-mail directly across the internet. The exhibit's computer is able to control the information flow with the nomadic router by running software, such as a web browser, which talks with the service/control software stored in the nomadic router. The standard web browser can control display and capture of lead information, collection of qualification information, and selection of information to be distributed back to the attendee.

Fixed Nomadic Router

As briefly described above, the fixed nomadic router applications provide the same basic functionality and architecture as the portable nomadic router with the nomadic router stored in one location. The fixed nomadic router acts as a surrogate or "Home Agent" for the user when he/she is away on travel. When the user wishes to register or utilize their host device elsewhere in the network, the portable nomadic router will register with the fixed nomadic router where it is temporarily attached to the network so information can be forwarded to the user's new location. The fixed nomadic router can also be used to house the master copy of the user's E-mail for the nomadic E-mail service, or files for the nomadic file synchronizer.

Mobile Virtual Private Network

The nomadic router provides the mapping between the location-based IP address used in the internet today and the permanent user-based address housed in the host CPU. This mapping is done without support or knowledge of such mapping by the host CPU or user. The Internet RFC 2002 Mobile IP protocol specifies the mapping between permanent and temporary IP addresses. The unique aspect of the nomadic router is that the Mobile IP protocols are not necessarily running in, or supported by, the host CPU, but rather are internal to the nomadic router.

By implementing this protocol as part of the translation function in the nomadic router, the nomadic router can encapsulate packets from the host computer and transmit them back to the fixed nomadic router which are sent out (un-encapsulated) on the native (home) network. Replies from the home network are received by the fixed nomadic router and are encapsulated and sent back to the nomadic router. When packets are transmitted between the nomadic router and fixed nomadic router, the packets are encrypted and sent using the Internet Tunneling Protocol.

Since the (mobile) nomadic router provides location independence and the fixed nomadic router forwards all packets from a corresponding host to the host computer via the nomadic router, any changes in the location, failure of a network link, or attachment point of the mobile host computer does not cause any open session to be lost. This session loss prevention is possible since the fixed nomadic router pretends to be the mobile host computer, and the nomadic router pretends to be the home network. The fixed nomadic router and nomadic router translation functions hide the link and network loss from the transport and application session.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. It is understood that the present invention is broadly applicable to the field of electronic data communications using computers and other devices.

What is claimed is:

1. A method of enabling a user host device to communicate on a network, comprising:

receiving, at a first communication system including one or more network devices, an ARP request packet transmitted from a user host device, wherein the ARP request packet includes at least a sender IP address, a sender hardware address, and a target IP address that corresponds to a static IP address of a second communication system, wherein the static IP address of the second communication system is different from any IP address associated with the first communication system;

preparing an ARP response packet that includes at least a sender IP address that corresponds to the static IP address of the second communication system, a sender hardware address that corresponds to a hardware address of the first communication system, a target IP address that corresponds to the sender IP address of the ARP request packet, and a target hardware address corresponding to the sender hardware address of the ARP request packet;

transmitting the ARP response packet from a network interface of the first communication system; and receiving at the first communication system a network packet transmitted from the user host device and received at the first communication system, wherein the network packet comprises at least a target IP address that differs from the IP addresses of the first and second communication systems and a target hardware address that corresponds to the hardware address of the first communication system.

2. The method of claim 1, wherein the network interface comprises an Ethernet port.

3. The method of claim 1, wherein the hardware addresses are MAC addresses.

4. The method of claim 1, wherein the ARP request packet further comprises a target hardware address that corresponds to a broadcast address.

5. The method of claim 1, wherein the method performed by the first communication system further comprises: modifying a sender address of the network packet to correspond to one of the one or more IP addresses of the first communication system, and transmitting the network packet.

6. The method of claim 1, wherein the first communication system has no information about the second communication system prior to the first communication system performing the step of receiving an ARP request packet transmitted from the user host device.

7. A connection system comprising:

a memory containing a broadcast handling function;

a processor executing the broadcast handling function; and a network interface configured to receive an ARP request packet transmitted by a first device, wherein the ARP request packet includes at least a sender IP address, a sender hardware address, and a target IP address that does not correspond to any IP address associated with the connection system;

wherein the broadcast handling function is configured to responsively prepare and cause the transmission of an ARP response packet that includes at least a sender IP address that corresponds to the target IP address of the ARP request packet, a sender hardware address that corresponds to a hardware address of the connection system, a target IP address that corresponds to the sender IP address of the ARP request packet, and a target hardware address that corresponds to the sender hardware address of the ARP request packet; and wherein the network interface is further configured to receive a network packet transmitted by the first device, the network packet including a target IP address that corresponds to the target IP address of the ARP request packet and a target hardware address that corresponds to the hardware address of the connection system.

8. The connection system of claim 7, wherein the ARP request packet is transmitted at least in part over a wireless network.

9. The connection system of claim 7, wherein the hardware addresses are MAC addresses.

10. The connection system of claim 7, wherein the ARP request packet further comprises a target hardware address associated with a broadcast address.

11. The connection system of claim 7, wherein the network interface is further configured to modify a sender address of the network packet to correspond to one of the one or more IP addresses of the connection system, and wherein the network interface is further configured to transmit the network packet.

12. The connection system of claim 7, wherein the target IP address is a static IP address, and the connection system has no information about the static IP address prior to the network interface receiving an ARP request packet transmitted by the first device.

13. A non-transitory computer-readable medium comprising executable instructions configured to cause one or more computer processors to perform operations comprising:

receiving, at a first communication system including one or more network devices, an ARP request packet transmitted from a user host device, wherein the ARP request packet includes at least a sender IP address, a sender hardware address, and a target IP address that corresponds to a static IP address of a second communication system, wherein the static IP address of the second communication system is different from any IP address associated with the first communication system;

preparing an ARP response packet that includes at least a sender IP address that corresponds to the static IP address of the second communication system, a sender hardware address that corresponds to a hardware address of the first communication system, a target IP address that corresponds to the sender IP address of the ARP request packet, and a target hardware address corresponding to the sender hardware address of the ARP request packet;

transmitting the ARP response packet from a network interface of the first communication system.

14. The non-transitory computer-readable medium of claim 13, wherein the ARP request packet further comprises a target hardware address that corresponds to a broadcast address.

15. The non-transitory computer-readable medium of claim 13, wherein the sender hardware address is a MAC address, and the hardware address of the first communication system is a MAC address.

16. The non-transitory computer-readable medium of claim 13, wherein the executable instructions are further configured to cause the one or more computer processors to receive a network packet transmitted from the user host device and received at the first communication system, wherein the network packet comprises at least a target IP address that differs from the IP addresses of the first and second communication systems and a target hardware address that corresponds to the hardware address of the first communication system.

17. The non-transitory computer-readable medium of claim 13, wherein the executable instructions are further configured to cause the one or more computer processors to receive a network packet transmitted from the user host device and received at the first communication system, wherein the network packet comprises at least a target IP address that corresponds to the second communication system and a target hardware address that corresponds to the hardware address of the first communication system.

18. The non-transitory computer-readable medium of claim 13, wherein the ARP request packet is received via a network that includes a wireless network.

19. The non-transitory computer-readable medium of claim 13, wherein the executable instructions are further configured to cause the first communication system to accept all packets received on the network interface.

20. The non-transitory computer-readable medium of claim 13, wherein the executable instructions are further configured to cause the first communication system to act as a Dynamic Host Configuration Protocol (DHCP) server.

* * * * *